(12) United States Patent
Gu et al.

(10) Patent No.: US 12,177,638 B2
(45) Date of Patent: *Dec. 24, 2024

(54) BLUETOOTH COMMUNICATION SYSTEM CAPABLE OF AVOIDING VOICE INTERRUPTION, AND RELATED BLUETOOTH DEVICE SET

(71) Applicant: Realtek Semiconductor Corp., Hsinchu (TW)

(72) Inventors: Qing Gu, Suzhou (CN); Bi Wei, Suzhou (CN); Yu Hsuan Liu, Hsinchu (TW); Yi-Cheng Chen, Hsinchu (TW); Cheng Cai, Suzhou (CN); Hung Chuan Chang, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 402 days.

This patent is subject to a terminal disclaimer.

(21) Appl. No.: 17/667,805

(22) Filed: Feb. 9, 2022

(65) Prior Publication Data

US 2022/0272499 A1 Aug. 25, 2022

(30) Foreign Application Priority Data

Feb. 9, 2021 (CN) .......................... 202110177192.3

(51) Int. Cl.
*H04R 3/14* (2006.01)
*G06F 3/16* (2006.01)
(Continued)

(52) U.S. Cl.
CPC .............. *H04R 3/14* (2013.01); *G06F 3/165* (2013.01); *G06F 3/167* (2013.01); *G10L 15/22* (2013.01);
(Continued)

(58) Field of Classification Search
CPC ........ H04R 3/14; H04R 3/12; H04R 2420/07; H04R 2420/01; H04R 1/1041;
(Continued)

(56) References Cited

U.S. PATENT DOCUMENTS 8,879,722 B1  11/2014 Wang et al.
9,930,240 B2  3/2018 Song
(Continued)

OTHER PUBLICATIONS

Taiwanese Notice of Allowance dated Sep. 28, 2022 for Application No. 111104822 with an English translation.
(Continued)

*Primary Examiner* — Eric Myers
(74) *Attorney, Agent, or Firm* — Birch, Stewart, Kolasch & Birch, LLP

(57) ABSTRACT

A Bluetooth communication system is provided, which comprises a Bluetooth host device and a Bluetooth device set. The connections between the Bluetooth host device and the Bluetooth device set complies with the specification of Bluetooth Low Energy Audio technology. The Bluetooth device set comprises at least a first member device and a second member device. The first member device and the second member device may be configured in a first mode wherein uplink audio signal transmission is allowed, and the connections are carried out by isochronous streaming channels respectively. The first member device transmits captured voice data to the Bluetooth host device, while the second member device does not. When an event is triggered, the first member device can notify the second member device through the Bluetooth host device, so that the first member device and the second member device can carry out subsequent voice input handover procedures.

10 Claims, 10 Drawing Sheets

(51) Int. Cl.
*G10L 15/22* (2006.01)
*H04L 1/1607* (2023.01)
*H04M 1/60* (2006.01)
*H04R 3/12* (2006.01)
*H04W 4/08* (2009.01)
*H04W 4/80* (2018.01)
*H04W 36/14* (2009.01)
*H04W 36/24* (2009.01)
*H04W 40/24* (2009.01)
*H04W 72/0446* (2023.01)

(52) U.S. Cl.
CPC ............. *H04L 1/1614* (2013.01); *H04R 3/12* (2013.01); *H04W 4/08* (2013.01); *H04W 4/80* (2018.02); *H04W 36/14* (2013.01); *H04W 40/24* (2013.01); *H04W 72/0446* (2013.01); *G10L 2015/223* (2013.01); *H04M 1/6066* (2013.01); *H04R 2420/07* (2013.01); *H04W 36/249* (2023.05)

(58) Field of Classification Search
CPC ......... G06F 3/165; G06F 3/167; G10L 15/22; G10L 2015/223; H04L 1/1614; H04W 4/08; H04W 4/80; H04W 36/14; H04W 40/24; H04W 72/0446; H04W 36/24; H04W 36/249; H04W 76/14; H04W 76/15; H04M 1/6066; H04M 2250/02; Y02D 30/70
See application file for complete search history.

(56) References Cited

U.S. PATENT DOCUMENTS

| | | | |
|---|---|---|---|
| 11,647,332 B2* | 5/2023 | Gu | H04R 1/1041 455/41.3 |
| 2003/0099212 A1 | 5/2003 | Anjum et al. | |
| 2014/0348327 A1 | 11/2014 | Linde et al. | |

OTHER PUBLICATIONS

Taiwanese Office Action and Search Report dated Aug. 16, 2022 for Application No. 111104823 with an English translation.
Taiwanese Office Action and Search Report for Taiwanese Application No. 111104820, dated Aug. 2, 2022, with English translation.
Taiwanese Office Action and Search Report for Taiwanese Application No. 111104821, dated Aug. 2, 2022, with English translation.
U.S. Office Action for U.S. Appl. No. 17/668,002, dated Feb. 16, 2024.

* cited by examiner

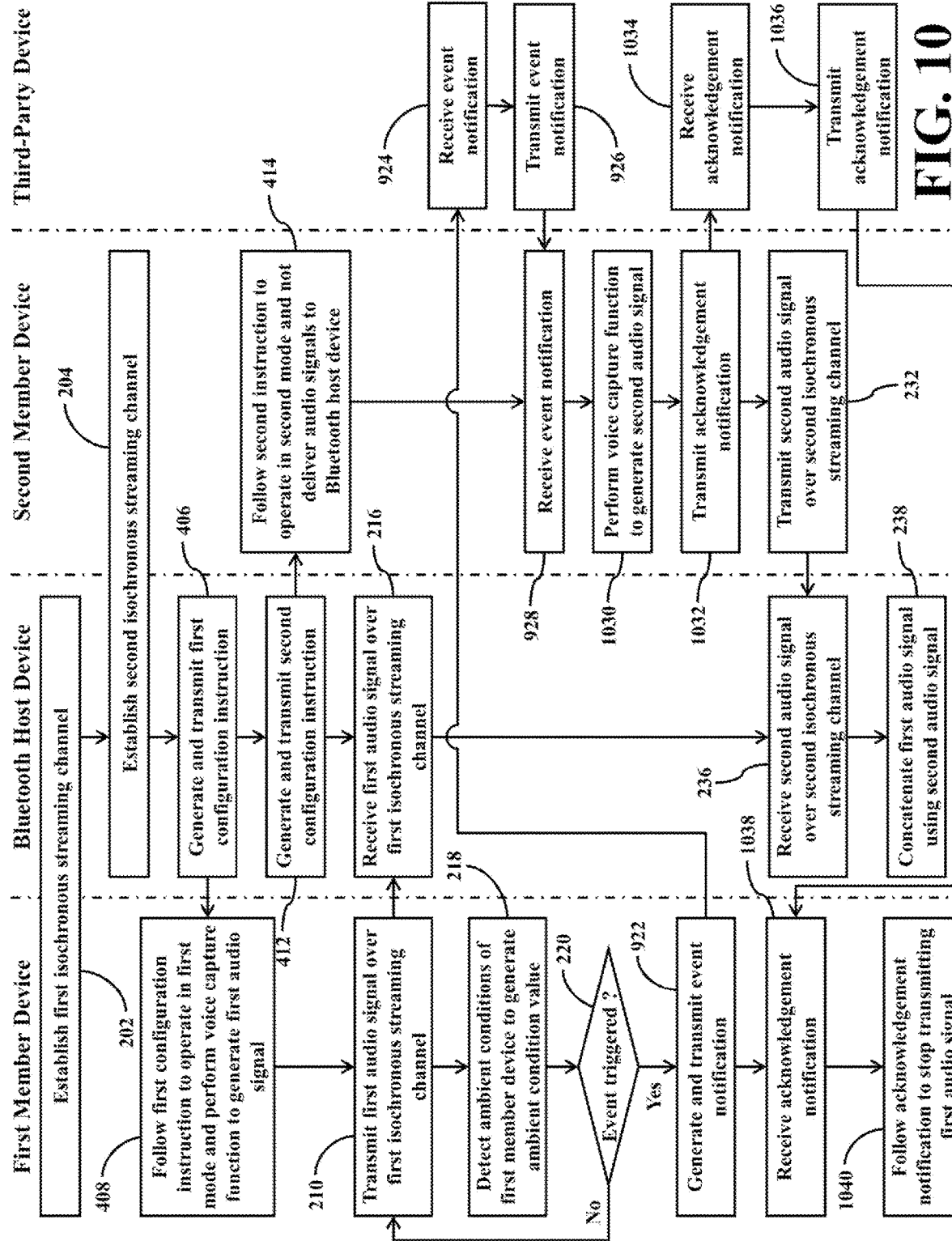

BLUETOOTH COMMUNICATION SYSTEM CAPABLE OF AVOIDING VOICE INTERRUPTION, AND RELATED BLUETOOTH DEVICE SET

CROSS-REFERENCE TO RELATED APPLICATIONS

This application claims the benefit of priority to Patent Application No. 202110177192.3, filed in China on Feb. 9, 2021; the entirety of which is incorporated herein by reference for all purposes.

BACKGROUND

The disclosure generally relates to Bluetooth Low-Energy communication technology, in particular to a Bluetooth communication system capable of avoiding voice interruption, and the Bluetooth host device and the Bluetooth device set therein.

Bluetooth technology is divided into two categories, one is the classic/legacy Bluetooth technology, and the other is the Bluetooth Low Energy (BLE) technology. The BLE technology and traditional Bluetooth technology are incompatible (or not completely compatible) with each other, but the two technologies can co-exist in the same Bluetooth device or the same Bluetooth chip. In other words, a single Bluetooth device or a single Bluetooth chip can be designed to support both the BLE technology and the traditional Bluetooth technology, or it can be designed to support only one of the Bluetooth communication standards. Based on the Bluetooth core specification version 5.2, the latest Bluetooth Low Energy audio (BLE audio) technology (hereinafter referred to as the BLE audio technology) is a leaping improvement in the development of the audio transmission specification since past 20 years. One of the major advantages of the BLE audio technology is that audio signals are transmitted with higher quality and greatly reduced power consumption. It is expectable that the market demand for Bluetooth device sets supporting the BLE audio technology, i.e., Bluetooth headset, multi-channel Bluetooth speaker, and etc., will be getting higher.

As well known, when a Bluetooth device set using the traditional Bluetooth technology is required to be connected with a Bluetooth host device, i.e., mobile phone or computer, a Bluetooth host device will treat multiple member devices in the Bluetooth device set as a single Bluetooth device. Therefore, the Bluetooth host device only needs to establish a connection with one of the member devices among the Bluetooth device set.

According to the BLE audio specification, when a Bluetooth device set wants to connect with a Bluetooth host device, a new approach called low energy (LE) isochronous channel is utilized, whereby data packets can be transmitted between Bluetooth devices with time limitations. The LE isochronous channel allows multiple receiver devices receiving data packets from the same source to perform audio playback synchronously. The transmitted data packets contain expiration timing information. Data packets not sent after the expiration timing will be discarded. That is, a Bluetooth receiver may decide whether to receive data packets according to some particular time waiting policies. The transmission of audio streams on the LE isochronous channel may be performed in two modes. One is the connection-oriented communication mode, and the other is the connectionless communication mode.

A data stream transmitted in the connection-oriented communication mode is referred to as the connected isochronous stream (CIS). When there is a need to synchronously transmit audio data, for example, when music is played through a pair of headphones, multiple Bluetooth peripheral devices are configured by the Bluetooth host device into a Bluetooth device set known as a connected isochronous groups (CIG). Specific reference information may be shared between multiple CISs in the same CIG to achieve audio synchronization when playing on multiple Bluetooth peripheral devices.

Generally, independent CIS channels are established by Bluetooth host device based on the BLE audio technology for the left and right headphones respectively. In the case of a voice call, usually only one side of audio reception circuit/microphone is turned on for voice capture, so that the captured voice data is transmitted as audio signals. When the earphone in charge of voice capture is unable to keep working, however, there is no solution defined in the BLE audio specification to effectively avoid the problem of voice interruption.

SUMMARY

The disclosure provides a Bluetooth communication system, which comprises a Bluetooth host device and a Bluetooth device set. The Bluetooth host device comprises a host-side communication circuit and a processing circuit. The processing circuit is coupled with the host-side communication circuit and is arranged to operably control the host-side communication circuit. The Bluetooth device set comprises at least a first member device and a second member device. The first member device comprises a first audio processing circuit, a first communication circuit, and a first control circuit. The first audio processing circuit is coupled with a first audio receiving circuit to operably convert the voice captured by the first audio receiving circuit into a first audio signal. The first communication circuit is arranged to operably communicate wirelessly with the host-side communication circuit. The first control circuit is coupled with the first communication circuit and the first audio processing circuit, and is arranged to operably control the first communication circuit and the first audio processing circuit. The second member device comprises a second audio processing circuit, a second communication circuit, a second communication circuit, and a second control circuit. The second audio processing circuit is coupled with a second audio receiving circuit, arranged to operably convert the voice captured by the second audio receiving circuit into a second audio signal. The second communication circuit is arranged to operably communicate wirelessly with the host-side communication circuit. The second control circuit is coupled with the second communication circuit and the second audio processing circuit, and is arranged to operably control the second communication circuit and the second audio processing circuit. The processing circuit is also arranged to operably establish a first isochronous streaming channel with the first member device via the host-side communication circuit, and a second isochronous streaming channel with the second member device via the host-side communication circuit. The processing circuit is also arranged to utilize the host-side communication circuit to transmit a first instruction to the first member device and a second instruction to the second member device. The first communication circuit is also arranged to operably receive the first instruction, and the first control circuit is also arranged to follow the first instruction to configure the first member device to operate in a first mode. When the first member device operates in the first mode, the first control circuit is arranged to utilize the first communication circuit to transmit the first audio signal to the Bluetooth host device over the first isochronous streaming channel. The second communication circuit is also arranged to operably receive the second instruction, and the second control circuit is also arranged to follow the second instruction to configure the second member device to operate in a second mode. Wherein, when the first member device operates in the first mode, the second member device operates in the second mode, and when the second member device operates in the second mode, the second communication circuit does not transmit the second audio signal to the Bluetooth host device.

The disclosure also provides a Bluetooth host device, which comprises a host-side communication circuit and a processing circuit. The host-side communication circuit is arranged to perform wireless communication with a Bluetooth device set, wherein the Bluetooth device set comprises at least a first member device and a second member device. The processing circuit is coupled with the host-side communication circuit and is arranged to control the host-side communication circuit. A first isochronous streaming channel may be established between the host-side communication circuit and the first member device, the host-side communication circuit and the second member device may be used to establish a second isochronous streaming channel. The processing circuit is also arranged to transmit a first instruction to the first member device via the host-side communication circuit to indicate that the first member device operates in a first mode. The processing circuit is also arranged to utilize the host-side communication circuit to transmit a second instruction to the second member device to indicate that the second member device operates in a second mode. When the first member device operates in the first mode, the host-side communication circuit may receive a first audio signal from the first member device over the first isochronous streaming channel. Wherein, when the first member device operates in the first mode, the second member device operates in the second mode, and when the second member device operates in the second mode, the second member device does not transmit sound signals to the Bluetooth host device.

The disclosure also provides a Bluetooth device set for wireless communication with a Bluetooth host device. The Bluetooth device set comprises a first member device and a second member device. The first member device comprises a first audio processing circuit, a first communication circuit, and a first control circuit. The first audio processing circuit is connected to a first audio receiving circuit, which is arranged to convert the voice captured by the first audio receiving circuit into a first audio signal. The first communication circuit is arranged to operably establish a first isochronous streaming channel with the Bluetooth host device for wireless communication. The first control circuit is coupled with the first communication circuit and the first audio processing circuit, and is arranged to control the first communication circuit and the first audio processing circuit. The second member device comprises a second audio processing circuit, a second communication circuit, and a second control circuit. The second audio processing circuit is connected to a second audio receiving circuit, which is arranged to convert the voice captured by the second audio receiving circuit into a second audio signal. The second communication circuit is arranged to operably establish a second isochronous streaming channel with the Bluetooth host device for wireless communication. The second control circuit is coupled with the second communication circuit and the second audio processing circuit, and is arranged to control the second communication circuit and the second audio processing circuit. The first control circuit is also arranged to operably receive a first instruction transmitted by the Bluetooth host device using the first communication circuit, so that the first member device is arranged to operate in a first mode. The second control circuit is also arranged to operably receive a second instruction transmitted by the Bluetooth host device using the second communication circuit, so that the second member device is arranged to operate in a second mode. When the first member device operates in the first mode, the second member device operates in the second mode, and when the second member device operates in the second mode, the second communication circuit does not transmit the second audio signal to the Bluetooth host device.

The disclosure further provides a Bluetooth communication system, which comprises a Bluetooth host device and a Bluetooth device set. The Bluetooth host device comprises a host-side communication circuit and a processing circuit. The processing circuit is coupled with the host-side communication circuit and is arranged to control the host-side communication circuit. The Bluetooth device set comprises at least a first member device and a second member device. The first member device comprises a first audio processing circuit, a first communication circuit, and a first control circuit. The first audio processing circuit is coupled with a first audio receiving circuit to convert the voice captured by the first audio receiving circuit into a first audio signal. The first communication circuit is arranged to conduct wireless communication with the host-side communication circuit. The first control circuit is coupled with the first communication circuit and the first audio processing circuit, and is arranged to control the first communication circuit and the first audio processing circuit. The second member device comprises a second audio processing circuit, a second communication circuit, and a second control circuit. The second audio processing circuit is coupled with a second audio receiving circuit to convert the voice captured by the second audio receiving circuit into a second audio signal. The second communication circuit is arranged to communicate wirelessly with the host-side communication circuit. The second control circuit is coupled with the second communication circuit and the second audio processing circuit, and is arranged to control the second communication circuit and the second audio processing circuit. The processing circuit is also arranged to operably establish a first isochronous streaming channel with the first member device via the host-side communication circuit, and a second isochronous streaming channel with the second member device via the host-side communication circuit. The processing circuit is also arranged to utilize the host-side communication circuit to transmit a first configuration instruction to the first member device and a second configuration instruction to the second member device. The first communication circuit is also arranged to operably receive the first configuration instruction, and the first control circuit is also arranged to follow the first configuration instruction to configure the first member device to operate in a first mode, and to utilize the first communication circuit to transmit the first audio signal to the Bluetooth host device over the first isochronous streaming channel. The second communication circuit is also arranged to operably receive the second configuration instruction, and the second control circuit is also arranged to follow the second configuration instruction to configure the second member device to operate in the first mode, and follow the second configuration instruction not to deliver the second audio signal to the Bluetooth host device through the second communication circuit. The first communication circuit and the second communication circuit are also arranged to communicate directly with each other.

The disclosure also provides a Bluetooth device set for wireless communication with a Bluetooth host device. The Bluetooth device set comprises at least a first member device and a second member device. The first member device comprises a first audio processing circuit, a first communication circuit, and a first control circuit. The first audio processing circuit is coupled with a first audio receiving circuit to convert the voice captured by the first audio receiving circuit into a first audio signal. The first communication circuit is arranged to operably establish a first isochronous streaming channel with the Bluetooth host device and conduct wireless communication. The first control circuit is coupled with the first communication circuit and the first audio processing circuit, and is arranged to control the first communication circuit and the first audio processing circuit. The second member device comprises a second audio processing circuit, a second communication circuit, and a second control circuit. The second audio processing circuit is coupled with a second audio receiving circuit to convert the voice captured by the second audio receiving circuit into a second audio signal. The second communication circuit is arranged to operably establish a second isochronous streaming channel with the Bluetooth host device for wireless communication. The second control circuit is coupled with the second communication circuit and the second audio processing circuit, and is arranged to control the second communication circuit and the second audio processing circuit. The first communication circuit is also arranged to operably receive a first configuration instruction transmitted by the Bluetooth host device, and the first control circuit is also arranged to follow the first configuration instruction to configure the first member device to operate in a first mode, and to utilize the first communication circuit to transmit the first audio signal to the Bluetooth host device over the first isochronous streaming channel. Wherein, the second communication circuit is also arranged to operably receive a second configuration instruction transmitted by the Bluetooth host device, and the second control circuit is also arranged to follow the second configuration instruction to configure the second member device to operate in the first mode, and follow the second configuration instruction not to deliver the second audio signal to the Bluetooth host device through the second communication circuit. The first communication circuit and the second communication circuit are also arranged to communicate directly with each other.

The disclosure also provides a Bluetooth communication system, including a Bluetooth host device and a Bluetooth device set. The Bluetooth host device comprises a host-side communication circuit and a processing circuit. The processing circuit is coupled with the host-side communication circuit and is arranged to control the host-side communication circuit. The Bluetooth device set comprises at least a first member device and a second member device. The first member device comprises a first audio processing circuit, a first communication circuit, and a first control circuit. The first audio processing circuit is coupled with a first audio receiving circuit to convert the voice captured by the first audio receiving circuit into a first audio signal. The first communication circuit is arranged to conduct wireless communication with the host-side communication circuit. The first control circuit is coupled with the first communication circuit and the first audio processing circuit, and is arranged to control the first communication circuit and the first audio processing circuit. The second member device comprises a second audio processing circuit, a second communication circuit, and a second control circuit. The second audio processing circuit is coupled with a second audio receiving circuit to convert the voice captured by the second audio receiving circuit into a second audio signal. The second communication circuit is arranged to communicate wirelessly with the host-side communication circuit. The second control circuit is coupled with the second communication circuit and the second audio processing circuit, and is arranged to control the second communication circuit and the second audio processing circuit. The processing circuit is also arranged to operably establish a first isochronous streaming channel with the first member device via the host-side communication circuit, and a second isochronous streaming channel with the second member device via the host-side communication circuit. The processing circuit is also arranged to utilize the host-side communication circuit to transmit a first configuration instruction to the first member device and a second configuration instruction to the second member device. The first communication circuit is also arranged to operably receive the first configuration instruction, and the first control circuit is also arranged to follow the first configuration instruction to configure the first member device to operate in a first mode, and to utilize the first communication circuit to transmit the first audio signal to the Bluetooth host device over the first isochronous streaming channel. The second communication circuit is also arranged to operably receive the second configuration instruction, and the second control circuit is also arranged to follow the second configuration instruction to configure the second member device to operate in the first mode, and follow the second configuration instruction not to deliver the second audio signal to the Bluetooth host device through the second communication circuit. The processing circuit is also arranged to utilize the host-side communication circuit to transmit an event notification to be transmitted by the first member device to the second member device.

The disclosure also provides a Bluetooth device set for wireless communication with a Bluetooth host device. The Bluetooth device set comprises at least a first member device and a second member device. The first member device comprises a first audio processing circuit, a first communication circuit, and a first control circuit. The first audio processing circuit is coupled with a first audio receiving circuit to convert the voice captured by the first audio receiving circuit into a first audio signal. The first communication circuit is arranged to operably establish a first isochronous streaming channel with the Bluetooth host device and conduct wireless communication. The first control circuit is coupled with the first communication circuit and the first audio processing circuit, and is arranged to control the first communication circuit and the first audio processing circuit. The second member device comprises a second audio processing circuit, a second communication circuit, and a second control circuit. The second audio processing circuit is coupled with a second audio receiving circuit to convert the voice captured by the second audio receiving circuit into a second audio signal. The second communication circuit is arranged to operably establish a second isochronous streaming channel with the Bluetooth host device for wireless communication. The second control circuit is coupled with the second communication circuit and the second audio processing circuit, and is arranged to control the second communication circuit and the second audio processing circuit. The first communication circuit is also arranged to operably receive a first configuration instruction transmitted by the Bluetooth host device, and the first control circuit is also arranged to follow the first configuration instruction to configure the first member device to operate in a first mode, and to utilize the first communication circuit to transmit the first audio signal to the Bluetooth host device over the first isochronous streaming channel. Wherein, the second communication circuit is also arranged to operably receive a second configuration instruction transmitted by the Bluetooth host device, and the second control circuit is also arranged to follow the second configuration instruction to configure the second member device to operate in the first mode, and follow the second configuration instruction not to deliver the second audio signal to the Bluetooth host device through the second communication circuit. The first control circuit is also arranged to utilize the first communication circuit to transmit an event notification for the second member device to the Bluetooth host device. The second control circuit is also arranged to utilize the second communication circuit to receive the event notification transmitted from the first member device via the Bluetooth host device.

The disclosure further provides a Bluetooth communication system, including a Bluetooth host device, a Bluetooth device set, and a third-party device. The Bluetooth host device comprises a host-side communication circuit and a processing circuit. The processing circuit is coupled with the host-side communication circuit and is arranged to control the host-side communication circuit. The Bluetooth device set comprises at least a first member device and a second member device. The third-party device is not a member of the Bluetooth device set, and contains a wireless communication circuit and a core processor circuit. The core processor circuit is coupled with the wireless communication circuit and is arranged to control the wireless communication circuit to conduct wireless communication with the first member device and the second member device. The first member device comprises a first audio processing circuit and a first communication circuit. The first audio processing circuit is coupled with a first audio receiving circuit to convert the voice captured by the first audio receiving circuit into a first audio signal. The first communication circuit is arranged to perform wireless communication with the host-side communication circuit and the wireless communication circuit. The first control circuit is coupled with the first communication circuit and the first audio processing circuit, and is arranged to control the first communication circuit and the first audio processing circuit. The second member device comprises a second audio processing circuit, a second communication circuit, and a second control circuit. The second audio processing circuit is coupled with a second audio receiving circuit to convert the voice captured by the second audio receiving circuit into a second audio signal. The second communication circuit is arranged to perform wireless communication with the host-side communication circuit and the wireless communication circuit. The second control circuit is coupled with the second communication circuit and the second audio processing circuit, and is arranged to control the second communication circuit and the second audio processing circuit. The processing circuit is also arranged to operably establish a first isochronous streaming channel with the first member device via the host-side communication circuit, and a second isochronous streaming channel with the second member device via the host-side communication circuit. The processing circuit is also arranged to utilize the host-side communication circuit to transmit a first configuration instruction to the first member device and a second configuration instruction to the second member device. The first communication circuit is also arranged to operably receive the first configuration instruction, and the first control circuit is also arranged to follow the first configuration instruction to configure the first member device to operate in a first mode, and to utilize the first communication circuit to transmit the first audio signal to the Bluetooth host device over the first isochronous streaming channel. The second communication circuit is also arranged to operably receive the second configuration instruction, and the second control circuit is also arranged to follow the second configuration instruction to configure the second member device to operate in the first mode, and follow the second configuration instruction not to deliver the second audio signal to the Bluetooth host device via the second communication circuit. The core processor circuit is further arranged to operably utilize the wireless communication circuit to forward an event notification to be transmitted from the first member device to the second member device.

The disclosure also provides a Bluetooth device set for wireless communication with a Bluetooth host device and a third-party device, wherein the third-party device is not a member of the Bluetooth device set. The Bluetooth device set comprises at least a first member device and a second member device. The first member device comprises a first audio processing circuit and a first communication circuit. The first audio processing circuit is coupled with a first audio receiving circuit to convert the voice captured by the first audio receiving circuit into a first audio signal. The first communication circuit is arranged to perform wireless communication with the host-side communication circuit and the wireless communication circuit. The first control circuit is coupled with the first communication circuit and the first audio processing circuit, and is arranged to control the first communication circuit and the first audio processing circuit. The second member device comprises a second audio processing circuit, a second communication circuit, and a second control circuit. The second audio processing circuit is coupled with a second audio receiving circuit to convert the voice captured by the second audio receiving circuit into a second audio signal. The second communication circuit is arranged to perform wireless communication with the host-side communication circuit and the wireless communication circuit. The second control circuit is coupled with the second communication circuit and the second audio processing circuit, and is arranged to control the second communication circuit and the second audio processing circuit. The processing circuit is also arranged to operably establish a first isochronous streaming channel with the first member device via the host-side communication circuit, and a second isochronous streaming channel with the second member device via the host-side communication circuit. The processing circuit is also arranged to utilize the host-side communication circuit to transmit a first configuration instruction to the first member device and a second configuration instruction to the second member device. The first communication circuit is also arranged to operably receive the first configuration instruction, and the first control circuit is also arranged to follow the first configuration instruction to configure the first member device to operate in a first mode, and to utilize the first communication circuit to transmit the first audio signal to the Bluetooth host device over the first isochronous streaming channel. The second communication circuit is also arranged to operably receive the second configuration instruction, and the second control circuit is also arranged to follow the second configuration instruction to configure the second member device to operate in the first mode, and follow the second configuration instruction not to deliver the second audio signal to the Bluetooth host device via the second communication circuit. The first control circuit is also arranged to utilize the first communication circuit to transmit messages for the second member device to the third-party device, or receive messages to be transmitted from the second member device to the first member device via the third-party device. The second control circuit is also arranged to utilize the second communication circuit to transmit messages for the first member device to the third-party device, or receive messages to be transmitted from the first member device to the second member device via the third-party device.

Both the foregoing general description and the following detailed description are examples and explanatory only, and are not restrictive of the invention as claimed.

BRIEF DESCRIPTION OF THE DRAWINGS

FIG. 10 shows a simplified flowchart of a voice input handover method according to another embodiment of the present disclosure.

DETAILED DESCRIPTION

Reference is made in detail to embodiments of the disclosure, which are illustrated in the accompanying drawings. The same reference numbers may be used throughout the drawings to refer to the same or like parts, components, or operations.

Figure 1:
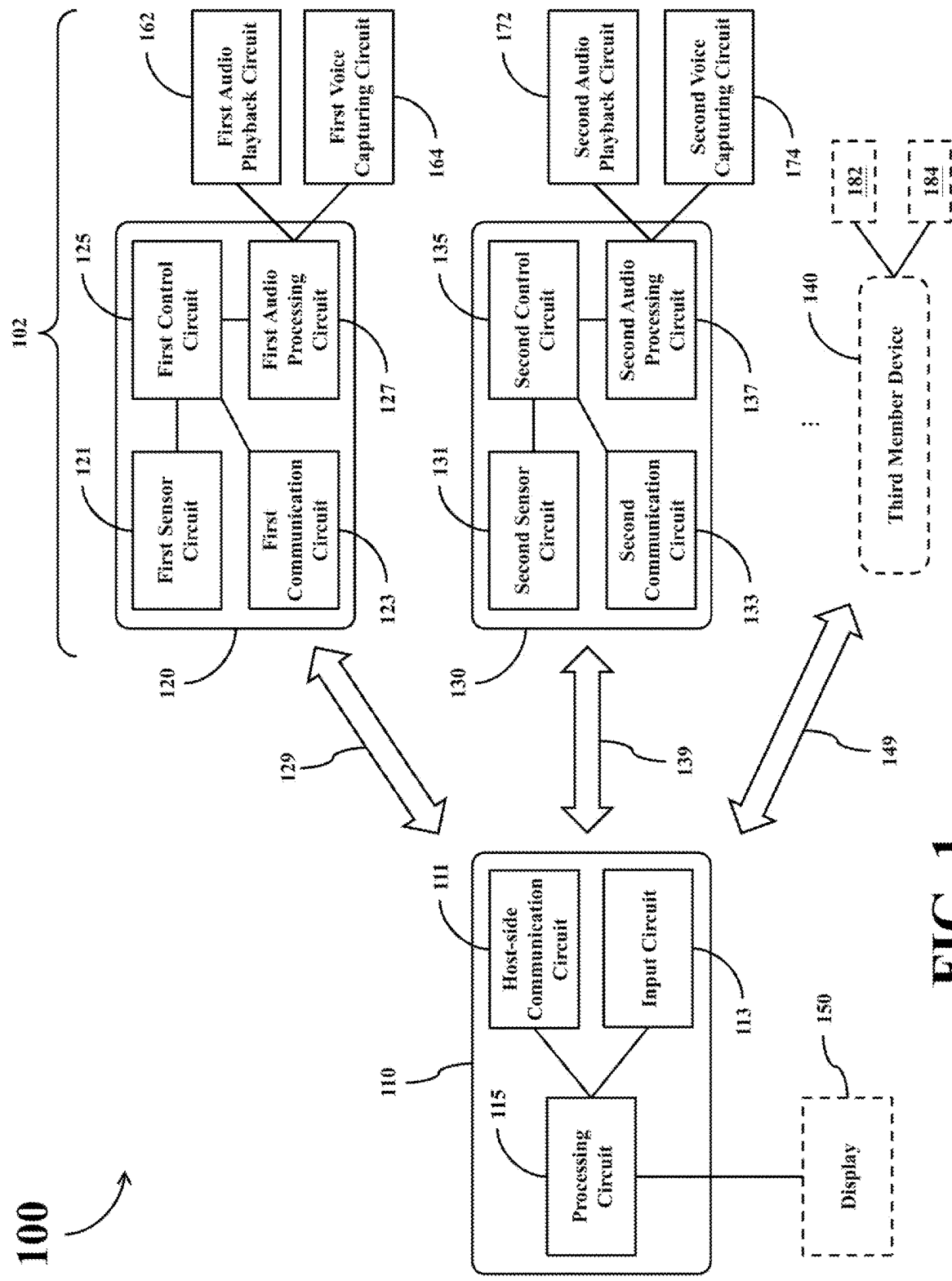
FIG. 1 shows a simplified functional block diagram of a Bluetooth communication system according to one embodiment of the present disclosure.

FIG. 1 shows a simplified functional block diagram of a Bluetooth communication system 100 according to one embodiment of the present disclosure. The Bluetooth communication system 100 comprises a Bluetooth host device 110 and a Bluetooth device set 102, wherein the Bluetooth device set 102 may include a plurality of member devices.

In practical applications, a Bluetooth piconet can be established by a plurality of member devices in Bluetooth device set 102 using various ways complying with the specifications of Bluetooth communication standard, and through the Bluetooth piconet, various instructions or data can be transmitted. Alternatively, a plurality of member devices in the Bluetooth device set 102 may collectively form a coordinated set complying with the Bluetooth communication standards.

In the embodiment, the Bluetooth host device 110 and all member devices in the Bluetooth device set 102 support the Bluetooth LE Audio (BLE Audio) technology (hereinafter referred to as BLE Audio technology) specified by the Bluetooth Core Specification Version 5.2 or newer versions. Accordingly, a user may connect the Bluetooth host device 110 with the Bluetooth device set 102 to utilize the Bluetooth device set 102 to conduct various audio playback operations.

For example, two member devices in the Bluetooth device set 102 may cooperate with appropriate audio playback circuits to collectively form a pair of Bluetooth earphones or a 2.0 channel speaker set. For another example, three member devices in the Bluetooth device set 102 may cooperate with appropriate audio playback circuits to collectively form a 2.1 channel speaker set. For another example, sis member devices in the Bluetooth device set 102 may cooperate with appropriate audio playback circuits to collectively form a 5.1 channel speaker set. For another example, eight member devices in the Bluetooth device set 102 may cooperate with appropriate audio playback circuits to collectively form a 7.1 channel speaker set.

To reduce the complexity of the drawing, only three exemplary member devices are shown in FIG. 1, a first member device 120, a second member device 130, and a third member device 140. In the embodiment of FIG. 1, the first member device 120 is coupled with a first audio playback circuit 162 and a first voice capturing circuit 164, the second member device 130 is coupled with a second audio playback circuit 172 and a second voice capturing circuit 174, while the third member device 140 is coupled with a third audio playback circuit 182 and a third voice capturing circuit 184.

A user may connect the Bluetooth host device 110 with the first member device 120, the second member device 130, and the third member device 140 in the Bluetooth device set 102, so as to utilize the aforementioned member devices to control related audio playback circuits to playback audio data sent from the Bluetooth host device 110 that adapts the BLE Audio technology.

In the embodiment of FIG. 1, the Bluetooth host device 110 comprises a host-side communication circuit 111, an input circuit 113, and a processing circuit 115. The first member device 120 comprises a first communication circuit 123, a first sensor circuit 121, a first control circuit 125, and a first audio processing circuit 127. The second member device 130 comprises a second communication circuit 133, a second sensor circuit 131, a second control circuit 135, and a second audio processing circuit 137.

In the Bluetooth host device 110, the host-side communication circuit 111 is arranged to operably receive and transmit various Bluetooth packets. The input circuit 113 is arranged to operably receive various operation instructions issued by the user. The processing circuit 115 is coupled with the host-side communication circuit 111 and the input circuit 113. The Processing circuit 115 is arranged to operably generate various Bluetooth packets to be transmitted through the host-side communication circuit 111, and analyze various Bluetooth packets received by the host-side communication circuit 111 to obtain relevant data or instructions. The processing circuit 115 is further arranged to control the operation of Bluetooth host device 110 according to various operation instructions issued by the user through the input circuit 113.

The term "Bluetooth packet" used throughout the description and the claims also encompass various protocol data units (PDUs) specified by various Bluetooth communication standards.

In some embodiments, the processing circuit 115 is further coupled with a display 150, and is arranged to control the operation of the display 150 to display relevant information or images to the user.

In the first member device 120, the first communication circuit 123 is arranged to operably receive and transmit various Bluetooth packets. The first sensor circuit 121 is arranged to operably detect the ambient conditions around the device to generate an ambient condition value. The first control circuit 125 is coupled with the first communication circuit 123 and the first sensor circuit 121. The first control circuit 125 is arranged to operably generate various Bluetooth packets to be transmitted via the first communication circuit 123, decode various Bluetooth packets received by the first communication circuit 123 to obtain relevant data or instructions, and control operations of the first sensor circuit 121. In addition, the first control circuit 125 is further arranged to operably generate an event notification when the ambient condition value meets a triggering condition.

The first audio processing circuit 127 is coupled with the first control circuit 125, the first audio playback circuit 162, and the first voice capturing circuit 164. The first audio processing circuit 127 is arranged to operably process the audio data transmitted from Bluetooth host device 110 according to instructions from the first control circuit 125 (e.g., to encode or decode the audio data, and/or to convert the data format), and control the first audio playback circuit 162 to playback the audio data content. The first audio processing circuit 127 is further arranged to operably encode voice captured by first voice capturing circuit 164 to respectively generate audio data.

In the second member device 130, the second communication circuit 133 is arranged to operably receive and transmit various Bluetooth packets. The second sensor circuit 131 is arranged to operably detect the ambient conditions around the device to generate an ambient condition value. The second control circuit 135 is coupled with the second communication circuit 133 and the second sensor circuit 131. The second control circuit 135 is arranged to operably generate various Bluetooth packets to be transmitted via the second communication circuit 133, decode various Bluetooth packets received by the second communication circuit 133 to obtain relevant data or instructions, and control the operation of the second sensor circuit 131.

The second audio processing circuit 137 is coupled with the second control circuit 135, the second audio playback circuit 172, and the second voice capturing circuit 174. The second audio processing circuit 137 is arranged to operably process the audio data transmitted from the Bluetooth host device 110 according to the instruction of the second control circuit 135 (e.g., to encode or decode the audio data, and/or to convert the data format), and is arranged to control the second audio playback circuit 172 to playback the audio data content. The second audio processing circuit 137 is further arranged to operably encode voice captured by second voice capturing circuit 174 to respectively generate audio data.

In the embodiment, each of the Bluetooth host device 110, the first member device 120, and the second member device 130 supports the BLE Audio technology. In this situation, the processing circuit 115 of the Bluetooth host device 110 is further arranged to operably generate audio data complying with related specifications of the BLE Audio technology (hereinafter referred to as BLE audio data), and to operably utilize the host-side communication circuit 111 transmit the BLE audio data to all member devices in the Bluetooth device set 102. The first control circuit 125 of the first member device 120 is further arranged to operably utilize the first audio processing circuit 127 to process the BLE audio data transmitted from the Bluetooth host device 110, and to operably instruct the first audio processing circuit 127 to control the first audio playback circuit 162 to playback the contents of the BLE audio data. Similarly, the second control circuit 135 of the second member device 130 is further arranged to operably utilize the second audio processing circuit 137 to process the BLE audio data transmitted from the Bluetooth host device 110, and to operably instruct the second audio processing circuit 137 to control the second audio playback circuit 172 to playback the contents of the BLE audio data.

In some embodiments, the host-side communication circuit 111 of the Bluetooth host device 110 is further arranged to operably adopt various wired network transmission technologies or various Radio Access Technologies (RATs) to receive the voice data transmitted from a remote device (not shown in figures) through various networks (e.g., Internet, mobile communication networks, or various private networks). The processing circuit 115 is arranged to operably decode the voice data received by the host-side communication circuit 111, and arranged to operably utilize the host-side communication circuit 111 to transmit decoded voice data to the first member device 120 and/or the second member device 130 in the Bluetooth device set 102 in the form of Bluetooth packets, and to operably instruct the first member device 120 and/or the second member device 130 to utilize the first audio playback circuit 162 and/or the second audio playback circuit 172 to playback the voice data content.

The aforementioned RAT may be various 2nd Generation (2G) mobile communication technologies, various 3rd Generation (3G) mobile communication technologies, various 4th Generation (4G) mobile communication technologies, various 5th Generation (5G) mobile communication technologies, various wireless networking technologies specified by the IEEE 802.11 series standards, various Internet-of-Thing (IoT) communication technologies, various Narrow Band Internet of Thing (NB-IoT) communication technologies, various Vehicle-to-Vehicle communication technologies, various Vehicle-to-Everything (V2X) communication technologies, various satellite communication technologies, various wireless communication technologies proposed by other standard setting organizations, or the like.

On the other hand, the first member device 120 and/or the second member device 130 may utilize the first voice capturing circuit 164 and/or the second voice capturing circuit 174 to receive the user's voice, and may utilize the first audio processing circuit 127 and/or the second audio processing circuit 137 to generate related voice data. The first member device 120 and/or the second member device 130 may further utilize the first communication circuit 121 and/or the second communication circuit 131 to transmit the aforementioned voice data to the Bluetooth host device 110. In this situation, the processing circuit 115 of the Bluetooth host device 110 may further adopt the aforementioned wired network transmission technologies or RATs to transmit the voice data generated by the Bluetooth device set 102 to the remote device through various appropriate networks.

As a result, the user is enabled to utilize the cooperation of the Bluetooth host device 110 and the Bluetooth device set 102 to realize voice communication with the remote device.

In practice, the host-side communication circuit 111 in the Bluetooth host device 110 may be realized with appropriate wireless transceiver circuits supporting the Bluetooth communication protocol of the Bluetooth Core Specification Version 5.2 or a newer version. Alternatively, the host-side communication circuit 111 may be realized with various hybrid communication circuits supporting above Bluetooth communication protocol and also supporting the aforementioned wired network transmission technologies or RATs. If needed, the host-side communication circuit 111 may be coupled with an additional antenna (not shown in figures).

The input circuit 113 may be realized with various appropriate circuits capable of receiving the commands issued by the user, such as a keyboard, a mouse, a touch screen, a voice activated device, a gesture sensing device, or a hybrid of the aforementioned various devices.

The processing circuit 115 may be realized with an appropriate packet demodulation circuit, a digital computing circuit, a microprocessor, an ASIC, a single processor module, a combination of multiple processor modules, a single computer system, a combination of multiple computer systems, a single server, a combination of multiple servers, or a cloud computing system having appropriate computing capabilities and capable of parsing and generating Bluetooth packets adopting the BLE Audio technology specified by the Bluetooth Core Specification Version 5.2 or newer versions.

In practical applications, different functional blocks of the aforementioned Bluetooth host device 110 may be realized with separate circuits or may be integrated into a single IC chip or a single device.

For example, the input circuit 113 may be integrated into the processing circuit 115. For another example, the input circuit 113 and the display device 150 may be integrated into a single touch screen.

Alternatively, all functional blocks of the Bluetooth host device 110 may be integrated into a single IC chip, a mobile communication device (e.g., a cell phone), a wearable device, a tablet computer, a notebook computer, a desktop computer, an audio broadcast system, a voice guidance system, a voice broadcasting system, a vehicular communication device, a satellite communication device, a smart TC, a Bluetooth smart speaker, or the like.

In practice, the first communication circuit 123 and the second communication circuit 133 in the aforementioned Bluetooth device set 102 can be realized by appropriate Bluetooth communication circuits capable of supporting the Bluetooth communication protocol of the Bluetooth Core Specification Version 5.2 or newer versions. If needed, the first communication circuit 123 and the second communication circuit 133 may further be arranged to be coupled with additional antennas (not shown in figures).

Each of the first sensor circuit 121 and the second sensor circuit 131 may be realized by sensors with environmental sensing ability, such as magnetic sensors, gyroscopes, voltmeters, thermometers, touch sensing circuits, and the like.

Each of the first control circuit 125 and the second control circuit 135 may be realized with an appropriate packet demodulation circuit, a digital computing circuit, a microprocessor, a single processor module, a combination of multiple processor modules, or an ASIC having appropriate computing capabilities and capable of parsing and generating Bluetooth packets adopting the BLE Audio technology specified by the Bluetooth Core Specification Version 5.2 or newer versions.

In some embodiments, the aforementioned first communication circuit 123 and second communication circuit 133 may be realized with appropriate Bluetooth transmission circuits that also support the Bluetooth communication protocol of earlier Bluetooth versions (e.g., Bluetooth 2.0, Bluetooth 3.0, Bluetooth 4.0, Bluetooth 4.2, or the like). In this situation, the aforementioned first control circuit 125 and second control circuit 135 should be designed to be able to decode and generate Bluetooth packets defined by the Bluetooth communication protocol of earlier Bluetooth versions.

Each of the first audio processing circuit 127 and the second audio processing circuit 137 may be realized with digital computing circuits, microprocessors, ASICs, or digital-to-analog converters (DACs) capable of conducting various encoding/decoding processing and/or data format conversion on audio data.

In some embodiments, the first audio processing circuit 127 and the second audio processing circuit 137 may be respectively integrated into the first control circuit 125 and the second control circuit 135.

Different functional blocks of the aforementioned first member device 120 may be realized with separate circuits or may be integrated into a single IC chip, a single wearable Bluetooth device, or a single Bluetooth speaker Similarly, different functional blocks of the aforementioned second member device 130 may be realized with separate circuits or may be integrated into a single IC chip, a single wearable Bluetooth device, or a single Bluetooth speaker.

In addition, each of the first audio playback circuit 162 and the second audio playback circuit 172 may be realized with various appropriate circuits capable of receiving and playing audio data, such as various types of speakers. Each of the first voice capturing circuit 164 and the second voice capturing circuit 17 may be realized with various appropriate circuits capable of capturing voice and converting the captured voice into corresponding audio signals, such as various types of microphones.

In some embodiments, the first member device 120, the first audio playback circuit 162, and the first voice capturing circuit 164 may be integrated into a single device (e.g., a wearable Bluetooth device or a Bluetooth speaker). Similarly, the second member device 130, the second audio playback circuit 172, and the second voice capturing circuit 174 may be integrated into a single device (e.g., a wearable Bluetooth device or a Bluetooth speaker).

The main circuit structure and implementations of other member devices (e.g., the third member device 140), other audio playback circuits (e.g., the third audio playback circuit 182), and other voice capturing circuits (e.g., the third voice capturing circuit 184) in the Bluetooth device set 102, may be similar to the aforementioned corresponding member devices/corresponding circuits. But different additional circuit components may be provided in different member devices, different audio playback circuits, and/or different voice capturing circuits. The circuit structure of all member devices is not required to be exactly identical with each other. The circuit structure of all audio playback circuits is not required to be exactly identical with each other. The circuit structure of all voice capturing circuits are not required to be exactly identical with each other.

When the Bluetooth host device 110 and the member devices in the Bluetooth device set 102 support the BLE Audio technology, the user may utilize the Bluetooth communication system 100 to conduct various audio playback operations adopting the BLE Audio technology to reduce the power consumption of the Bluetooth communication system 100 while improving the overall audio playback quality.

As specified in the BLE audio specification, when the Bluetooth host device 110 conducts a two-way voice communication with the first member device 120 and the second member device 130 respectively, it is necessary to establish two independent isochronous streaming channels (CIS) for the two member devices to respectively receive downlink audio data transmitted by Bluetooth host device 110 to be played synchronously. In the aspect of voice picking up, the Bluetooth host device 110 may allocate one of the two member devices to perform a voice input operation, including controlling a voice capturing circuit to capture user voices, and transmitting audio signals converted from the captured voices to the Bluetooth host device 110. In other words, only one of the Bluetooth member devices at a time delivers audio signals to the Bluetooth host device 110. However, there are some unsolved deficiencies in the BLE audio specification. For example, a user may make a voice call using a True Wireless Stereo (TWS) product, wherein only one of the buds is working on voice capturing. If the working bud cannot capture voice due to unexpected incidents, the BLE audio specification does not define how to promptly activate another bud in the TWS product to continue the voice input operation, that is, to perform a voice input handover. Therefore, the described art is disadvantageous for the voice call being vulnerable from interruptions.

To solve the problem of voice input handover during a BLE-audio-based voice call, the aforementioned Bluetooth communication system 100 is arranged to adopt different voice input handover mechanisms for different scenarios.

Figure 2:
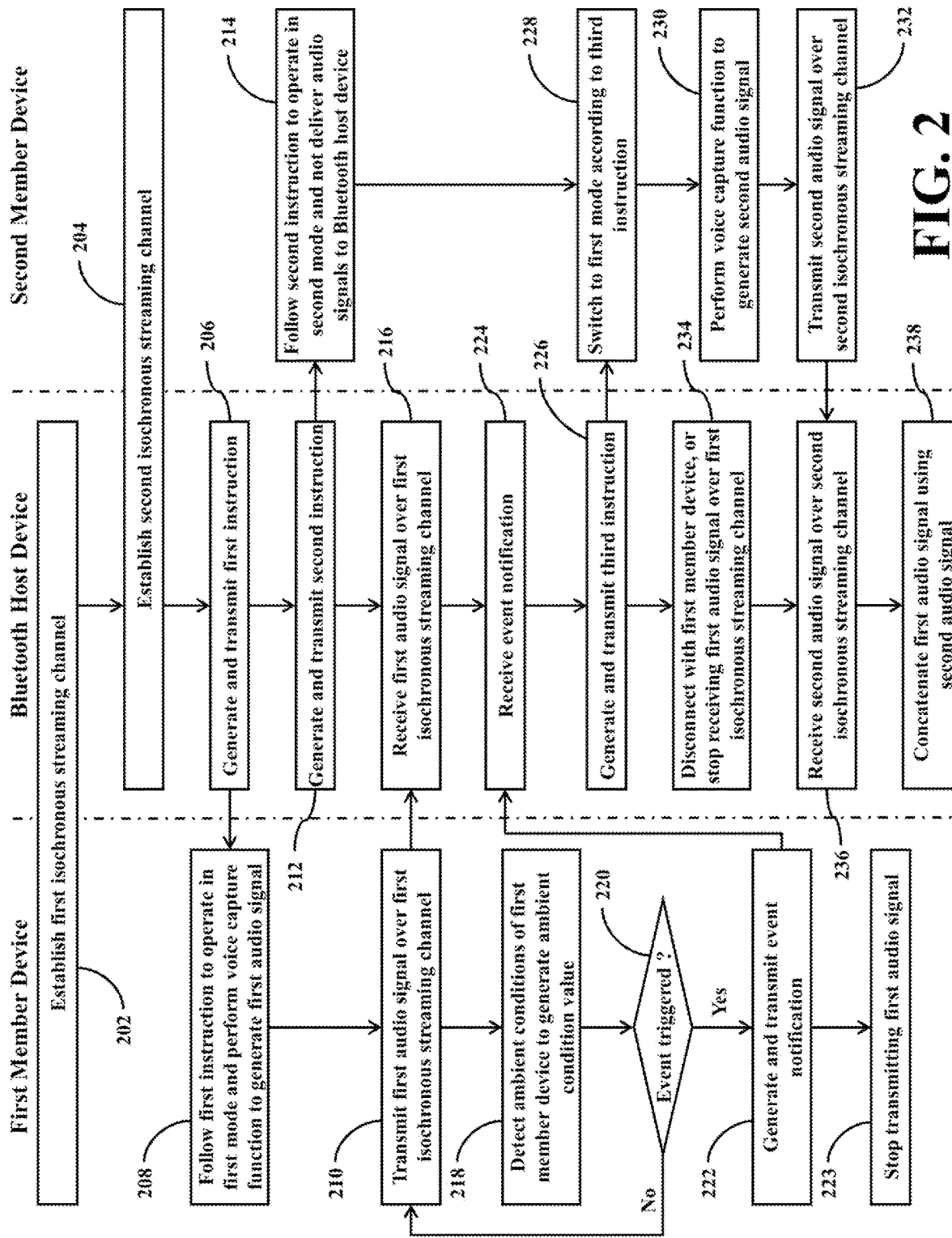
FIG. 2 shows a simplified flowchart of a voice input handover method according to one embodiment of the present disclosure.

The operations of the Bluetooth communication system 100 will be further described in the following by reference to FIG. 2. FIG. 2 is a simplified flowchart of a voice input handover method according to an embodiment of the present disclosure.

In FIG. 2, operations within a column under the name of a specific device are operations to be performed by the specific device. For example, operations within a column under the label "Bluetooth host device" are operations to be performed by the Bluetooth host device 110; operations within a column under the label "first member device" are operations to be performed by the first member device 120; operations within a column under the label "second member device" are operations to be performed by the second member device 130; and so forth. The same analogous arrangement also applies to the subsequent flowcharts.

In operation 202, the Bluetooth host device 110 is arranged to establish a first isochronous streaming channel 129 with the first member device 120 in the Bluetooth device set 102 based on the BLE audio technology.

In practice, isochronous channels based on the BLE protocol are firstly established between the Bluetooth host device 110 and the first member device 120. The channels may be connection oriented or connectionless. The two types of isochronous channels are generally based on the isochronous physical channel specified in the BLE audio technology. When isochronous physical channels are established, a timing sequence of the first data packet will be allocated as a reference for subsequent data packets, so as to realize synchronization between multiple channels. On each isochronous physical channel, various logical channels are further be established to support two-way transmission. For example, a data stream established on the connection oriented physical channel is called a connected isochronous stream (CIS), a point-to-point isochronous communication dedicated to two connected devices. Transmission processes of a CIS are bound to some kind of expiration timing information. That is, any packet that is not sent within a validity timing limit may be discarded. A logical channel for CIS transmission is hereinafter referred to a CIS channel. The first isochronous streaming channel 129 in the embodiment are referred to as a CIS channel established based on the BLE audio specification to support two-way voice transmissions.

In operation 204, the second member device 130 in the Bluetooth host device 110 and the Bluetooth device set 102 are arranged to establish a second isochronous streaming channel 139 based on the BLE audio technology.

Analogous to the first isochronous streaming channel 129, the second isochronous streaming channel 139 may also be a CIS channel established based on the aforementioned BLE audio specification to support two-way voice transmissions. In the embodiment, the Bluetooth host device 110 is arranged to configure the first member device 120 and the second member device 130 in a connected isochronous groups (CIG). CIS channels belonging to the same CIG are arranged to share specific reference data, so that a synchronized playback operation can be realized on multiple Bluetooth peripheral devices.

In operation 206, the processing circuit 115 is arranged to generate a first instruction, and utilize the host-side communication circuit 111 to transmit the first instruction to the first member device 120, such that the first member device 120 is directed to operate in a first mode.

In operation 208, by following the first instruction, the first control circuit 125 of the first member device 120 is directed to control the first member device 120 to operate in the first mode, and to carry out a voice capture function to generate the first audio signal.

In practice, the sequential orders of operations 202 and 204 are not limited by the flowchart, and neither are the sequential orders of operations 206 and 208.

In practice, the first member device 120 is arranged to capture sound from ambient environments, such as the user voice, through the first voice capturing circuit 164. Thereafter, the first audio processing circuit 127 digitizes and encodes the voice captured by the first voice capturing circuit 164 to generate the first audio signal. The first audio processing circuit 127 may include a low complexity communication codec (LC3, not shown) to render the first audio signal a lower code rate signal while keeping high sound quality.

In operation 210, the first control circuit 125 is arranged to control the first communication circuit 123 to transmit the first audio signal to the Bluetooth host device 110 over the first isochronous streaming channel 129.

In practice, the first mode may be a streaming mode implemented on the isochronous streaming channel. During operation, the Bluetooth host device 110 is arranged to transmit a data channel establishment instruction (e.g., hci_le_setup_iso_data_path), accompanied with relevant parameters to establish a data channel on the basis of the first isochronous streaming channel 129, so that the captured voice data can be transmitted between the first member device 120 and the Bluetooth host device 110. That is, in the first mode, the Bluetooth host device 110 not only transmits downlink audio signals to be playback on the first member device 120, but also receives the captured voice data transmitted from the first member device 120 (i.e., first audio signal).

In operation 216, the host-side communication circuit 111 is arranged to receive the first audio signal over the first isochronous streaming channel 129.

Specifically, when the first member device 120 operates in the first mode, the host-side communication circuit 111 is arranged to receive the first audio signal from the first member device 120 over the first isochronous streaming channel 129.

In operation 212, the processing circuit 115 is arranged to generate a second instruction and send the second instruction to the second member device 130 through the host-side communication circuit 111, such that the second member device 130 is directed to operate in a second mode.

In operation 214, by following the second instruction, the second control circuit 135 is directed to control the second member device 130 to operate in the second mode, and not to perform any voice input operation. In practice, the second mode is a mode based on the isochronous stream channel (for example, config mode). Generally, in the second mode, the second member device 130 is arranged to play audio signals sent from the Bluetooth host device 110, but is configured not to deliver voice data to the Bluetooth host device 110.

In operations, the manner in which the second control circuit 135 controls the second member device 130 not to perform any voice input operation may include but not limited to the following situations. For example, the second control circuit 135 may disable the second member device 130's authority for transmitting the sounds captured by the microphone according to the second instruction; the second control circuit 135 may disable the second voice capturing circuit 174 in the second member device 130; the second control circuit 135 may disable the voice coding function of the second audio processing circuit 137; or the second control circuit 135 may purposely opt not to utilize the second communication circuit 133 to transmit audio signals to the Bluetooth host device 110 according to the second instruction.

The scenario of FIG. 2 is summarized. When the first member device 120 operates in the first mode, the second member device 130 operates in the second mode, and when the second member device 130 operates in the second mode, the second member device 130 is configured not to deliver audio signals to the Bluetooth host device 110. Meanwhile, only the first member device 120 is arranged to deliver the captured voice data (that is, the first audio signal) to the Bluetooth host device 110.

In operation 218, the first sensor circuit 121 in the first member device 120 is arranged to detect the ambient conditions of the first member device 120 to generate an ambient condition value. For easy explanation, the embodiment assumes that the first member device 120 is one of the buds in a TWS product. In normal use, the first member device 120 is usually worn on the ear. If the first member device 120 leaves the ear or is stashed into the charging box, the ambient condition of the first member device 120 is changed. For example, a specific magnetic field is usually set in the charging box. When worn on the ear, the background sound captured by the inner microphone (not shown) of the first member device 120 is different from that in the off-ear state. The first sensor circuit 121 may be further arranged to sense the change of specific magnetic field or specific background sound, so as to output a corresponding ambient condition value. In practice, the first sensor circuit 121 is further arranged to be used to detect the remaining battery power or whether the user performs a specific touch operation. During operation, the first sensor circuit 121 is arranged to be sensitive to the ambient conditions change around the first member device 120, and subsequently generates the ambient condition value to be processed in the first control circuit 125.

In operation 220, the first control circuit 125 is arranged to analyze the ambient condition value generated by the first sensor circuit 121 to determine whether an event is triggered.

In a scenario of the embodiment, a trigger event may be referred to as the first member device 120 leaving the wearing state, or being docked into the storage box. The trigger event may further be defined as the remaining battery power being lower than a certain critical value, or a user entering a specific command through the touch interface. In various cases, the ambient condition value is a presentation of specific conditions or features, and the first control circuit 125 is therefore able to determine that a trigger event has occurred when the conditions or features are matched. For example, when the first member device 120 is put into the storage box, the magnet field or connector in the storage box causes the first sensor circuit 121 to detect specific environmental changes, and consequently the fact that first member device 120 is put into the storage box (hereinafter referred to as the box) can be determined. For another example, when the first member device 120 leaves the ear wearing state, the internal microphone in the first member device 120 may detect a change in the background sound, and consequently the fact that the first member device 120 is off the ear (hereinafter referred to as ear-off) is determined. When no event is triggered, the first member device 120 loops back to operations 218 and 220 to continuously monitor the ambient conditions. If the trigger event is detected by the first control circuit 125 (for example, the ambient condition value matches any of the various triggering conditions mentioned above), operation 222 is processed.

In operation 222, the first control circuit 125 is arranged to generate an event notification and utilize the first communication circuit 123 to transmit the event notification to Bluetooth host device 110.

In the embodiment, the first member device 120 may issue an event notification triggered by an event that further voice input operations cannot be continued. In other words, the first member device 120 is very likely to be disconnected or turned off as soon as the event notification is issued. Therefore, after the first member device 120 sends out the event notification, one possible implementation is to directly carry out operation 223 to stop the currently ongoing voice input operation so as to stop transmitting the first audio signal to the Bluetooth host device 110.

In operation 224, the host-side communication circuit 111 is arranged to receive the event notification from the first member device 120. During operation, the processing circuit 115 in the Bluetooth host device 110 is arranged to utilize the host-side communication circuit 111 to receive the event notification sent by the first member device 120 at any time for immediate disposal In operation 226, the processing circuit 115 is arranged to generate a third instruction, and utilize the host-side communication circuit 111 to transmit the third instruction to the second member device 130.

In the embodiment, the function of the third instruction is designed for voice input handover. The trigger event in operation 220 may indicate that the first member device 120 is unable to continue delivering the captured voice. Therefore, the Bluetooth host device 110 is arranged to configure the second member device 130 through the third instruction to perform voice capture and audio signal transmission operations instead of the first member device 120. The subsequent procedures are detailed as follows.

In operation 228, the second communication circuit 133 is arranged to receive the third instruction from the Bluetooth host device 110, while the second control circuit 135 is directed by the third instruction to configure the second member device 130 to operate in the first mode.

As described, the first mode may be referred to as a streaming mode implemented on the isochronous streaming channel. The Bluetooth host device 110 is arranged to switch the second member device 130 originally operating in the second mode to the first mode through the third instruction, and establish a data channel on the basis of the second isochronous streaming channel 139 between the second member device 130 and Bluetooth host device 110, allowing captured voice data to be transmitted thereon.

In operation 230, the second control circuit 135 is arranged to control the second audio processing circuit 137 to utilize the second voice capturing circuit 174 to perform the voice capture function to generate the second audio signal.

In operation 232, the second control circuit 135 is arranged to control the second communication circuit 133 to transmit second audio signal to the Bluetooth host device 110 over the second isochronous streaming channel 139. In practice, the third instruction may be arranged to configure the second member device 130 with a permission to transmit captured voice data, to instruct the second control circuit 135 to turn on the second voice capturing circuit 174, to enable the audio coding function in the second audio processing circuit 137, and/or to instruct the second control circuit 135 to utilize the second communication circuit 133 to start transmitting the second audio signal.

As such, when the second member device 130 operates in the first mode, the Bluetooth host device 110 not only transmits the audio signals to be played on the second member device 130, but also receives the captured voice data (i.e., the second audio signal) delivered by the second member device 130.

In operation 234, the processing circuit 115 is arranged to cut off the connection between the host-side communication circuit 111 and the first member device 120, or instruct the host-side communication circuit 111 to stop receiving the first audio signal over the first isochronous streaming channel 129. For example, the processing circuit 115 may execute a data path removal command (e.g., HCI_L-E_REMOVE_ISO_DATA_Path).

In operation 236, the host-side communication circuit 111 is arranged to receive the second audio signal from the second member device 130 over the second isochronous streaming channel 139.

In operation 238, the processing circuit 115 is arranged to concatenate the second audio signal with the first audio signal. The audio signal concatenation performed by the processing circuit 115 is briefly described as follows. During a two-way voice call, the processing circuit 115 receives the first audio signal from the first member device 120, and uses it as a data source to generate an output voice stream, which is thereafter transmitted to the remote end through the host-side communication circuit 111 (not shown). After the host-side communication circuit 111 receives the second audio signal from the second member device 130, the processing circuit 115 is arranged to utilize the second audio signal to seamlessly concatenate the first audio signal according to the synchronization timing information in the first audio signal and the second audio signal, and thereby generating the output voice stream for the host-side communication circuit 111 to continuously send out.

In actual operations, the sequential orders of operations 234 to 236 are not limited, and can be carried out simultaneously. To render smooth and uninterrupted user experience in the voice call, it is preferable to shorten the time gap between the first audio signal and second audio signal. One feasible implementation is for the Bluetooth host device 110 to start operation 234 after the second audio signal is received and concatenated in operation 238. On the other hand, the first member device 120 itself may shut down or interrupt the connection immediately after various trigger events, instead of transmitting the first audio signal. Therefore, the first member device 120 may not necessarily need to deal with the channel disconnection process in operation 234, but just directly update the connection status information or release all the allocated channel resources. For example, in the embodiment where the processing circuit 115 in the Bluetooth host device 110 comprises a codec supporting LC3, the first audio signal and the second audio signal respectively generated by the first member device 120 and the second member device 130 are transmitted to a remote end (not shown) through the host-side communication circuit 111 after a format conversion. When the voice input operation is handed over from first member device 120 to second member device 130, the processing circuit 115 takes the second audio signal instead of the first audio signal as a source for the voice call, such that the output voice stream is seamlessly concatenated.

In the aforementioned embodiment, the Bluetooth host device 110 is arranged to start the voice input handover after receiving the event notification transmitted by the first member device 120. However, this is only an exemplary embodiment and is not limited to the actual embodiment of the disclosure. For example, when the first member device 120 encounters unexpected incidents that causes disconnection, the processing circuit 115 of the Bluetooth host device 110 may recognize the exception to spontaneously activate the subsequent operations 226 to 238, such that the voice input operation of the Bluetooth device set 102 is kept uninterrupted.

As can be seen from the aforementioned description, the method of FIG. 2 highlights at least the following advantages. The two-way voice channel established by the BLE audio technology in the embodiment has extremely low energy consumption that significantly increases the endurance of first member device 120 and the second member device 130. In addition, the wireless transmission of audio has not only high stability, but also higher quality over traditional technologies. Using only one single microphone for voice capture is vulnerable to various events that may cause voice interruption. The embodiment defines event notification so that the Bluetooth host device 110 is arranged to control the voice input handover between first member device 120 and the second member device 130, which solves the problem not defined by the BLE audio specification. The triggering conditions of the event notification can be defined flexibly, so that the Bluetooth communication system 100 of the embodiment is applicable to a wide range of application scenarios. On the other hand, in the practical application of TWS products, the embodiment allows one of the battery draining earphones to temporarily rest and recharge without interrupting the two-way call. Great conveniences have been gained in various applications, particularly in important occasions.

Figure 3:
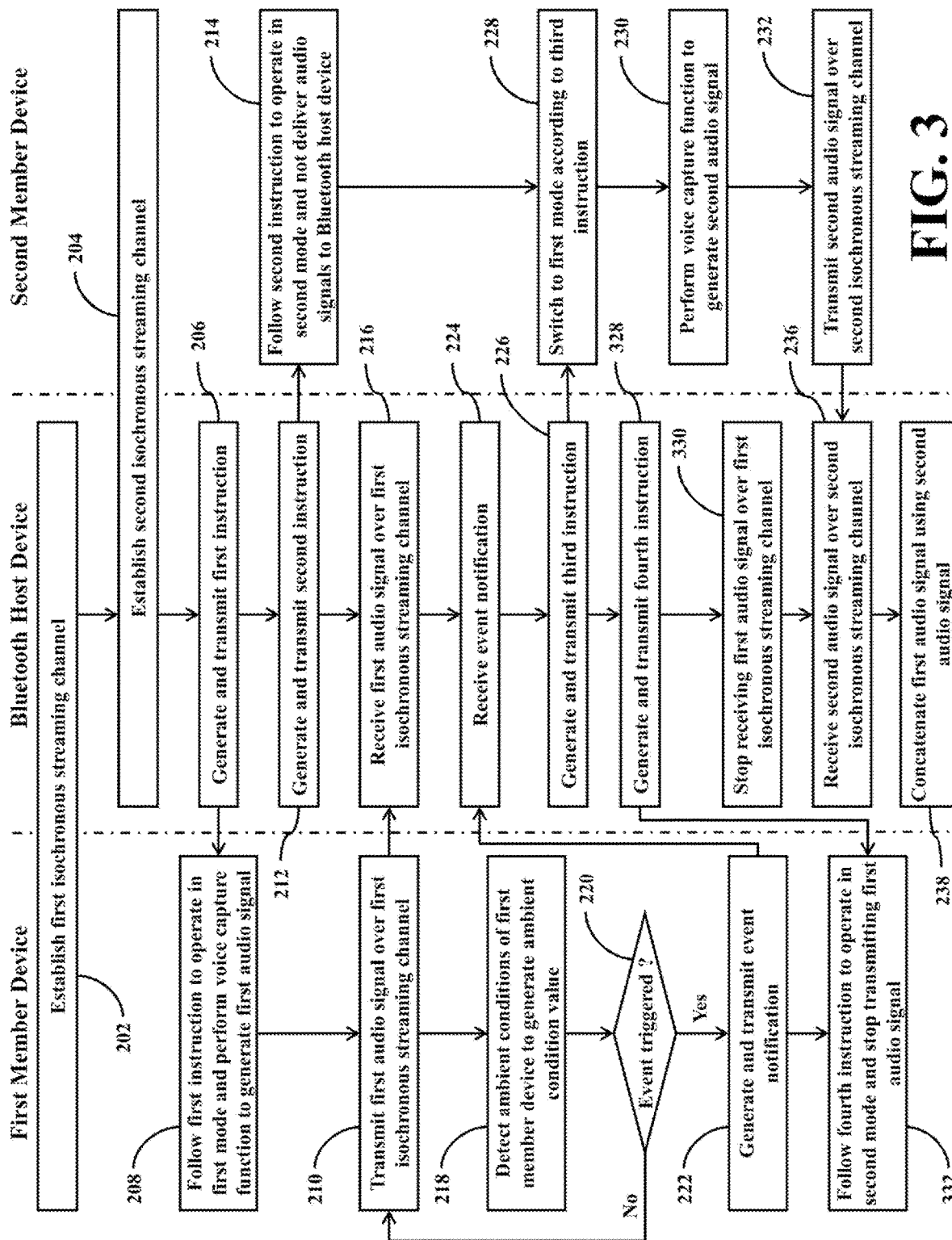
FIG. 3 shows a simplified flowchart of a voice input handover method according to another embodiment of the present disclosure.

The operations of the Bluetooth communication system 100 will be further described in combination with FIG. 3. FIG. 3 is a simplified flowchart of the voice input handover method according to an embodiment of the present disclosure. FIG. 3 is a further embodiment derived from FIG. 2. Operation 202 to operation 226 are substantially as analogous to the previous embodiment, therefore the descriptions are not repeated. The derived operations are described as follows.

After the Bluetooth host device 110 concludes operation 226, operation 328 is subsequently processed. The processing circuit 115 in the Bluetooth host device 110 is arranged to utilize the host-side communication circuit 111 to send a fourth instruction to the first member device 120 after the host-side communication circuit 111 receives the event notification. The fourth instruction is arranged to direct the first member device 120 to go through relevant procedures required to close the voice input operation, such as turning off the first voice capturing circuit 164, disabling the radio function in the first audio processing circuit 127, or directing the first communication circuit 123 to release the radio resources occupied by the microphone data channel. In some scenarios, the first member device 120 may send an event notification in operation 222, though, the first member device 120 does not necessarily need to completely go offline or power down. For example, the voice capture function may be stopped in the first member device 120, though, the playback function may still be needed. Therefore, the Bluetooth host device 110 is arranged to utilize the fourth instruction to properly configure the first member device 120 so that the first member device 120 can continue to operate without the voice capture function.

In operation 330, after transmitting the fourth instruction, the Bluetooth host device 110 is arranged to stop receiving the first audio signal over the first isochronous streaming channel 129.

In operation 332, after receiving the fourth instruction, the first member device 120 is directed by the fourth instruction to operate in the second mode wherein the voice input operation is not performed. More specifically, the first control circuit 125 in the first member device 120 is arranged to switch the first member device 120 to the second mode after receiving the fourth instruction via the first communication circuit 123.

As described in the previous embodiment, the second mode is referred to as a mode implemented on the isochronous streaming channel (such as a config mode) that no captured voice data is delivered. Generally, in the second mode, the first member device 120 may be arranged to play the audio signal provided by the Bluetooth host device 110, but does not deliver audio signals converted from the voice data captured by the first voice capturing circuit 164 to the Bluetooth host device 110. In operations, the manner in which the first member device 120 does not deliver audio signals may include but not limited to the following situations. For example, the first control circuit 125 may disable the first member device 120's authority for transmitting the sounds captured by the microphone according to the fourth instruction; the first control circuit 125 may disable the first voice capturing circuit 164 in the first member device 120; the first control circuit 125 may disable the voice coding function of the first audio processing circuit 127; or the first control circuit 125 may purposely opt not to utilize the first communication circuit 123 to transmit audio signals to the Bluetooth host device 110 according to the fourth instruction.

In actual operations, the sequential orders of operations 328, 330, 332, 236 and 238 are not limited as shown. To render smooth user experience without voice interruption, on the premise that the actual situation allows, one preferable implementation is for the Bluetooth host device 110 to process operations 328 and 330 after confirming successful reception of the second audio signal in operation 236.

As for the operations 228, 230, 232, 236 and 238 in FIG. 3, the details are substantially analogous to the previous embodiments and hence are not repeated herein.

In operation 218, the aforementioned embodiment shows that the first member device 120 is capable of detecting ambient conditions to generate an ambient condition value. On the other hand, the ambient condition value may further include the remaining battery power. In the case that each of the first member device 120 and the second member device 130 respectively monitors their remaining battery power, a power consumption balance function can be realized. For example, the first sensor circuit 121 of the first member device 120 and the second sensor circuit 131 of the second member device 130 may be arranged to periodically monitor their respective remaining battery power. In the process of a two-way voice call, the first member device 120 and the second member device 130 keeps reporting battery power information to the Bluetooth host device 110, allowing the Bluetooth host device 110 to accordingly configure the one of higher remaining battery power to operate in the first mode and start the voice input operation, and configure the one with lower remaining battery power to operate in the second mode of no voice data delivery. Thus, a premature power depletion of either side can be avoided in the middle of a two-way voice call. Such an implementation is also applicable for the case when there are three or more member devices in the Bluetooth device set 102.

The embodiment of FIG. 3 derived based on FIG. 2, in summary, further highlights at least the following advantages in addition to the aforementioned advantages. After an event is triggered, the Bluetooth host device 110 is further arranged to switch the first member device 120 back to the second mode through the fourth instruction, so that the first member device 120 is allowed to stop the voice input operation while maintaining the playback function. In practical applications of a TWS product, both buds may be arranged to perform voice input operations in turn. Thus, without interrupting the two-way communication, power consumptions of each bud can be balanced, which significantly improves the convenience.

Figure 4:
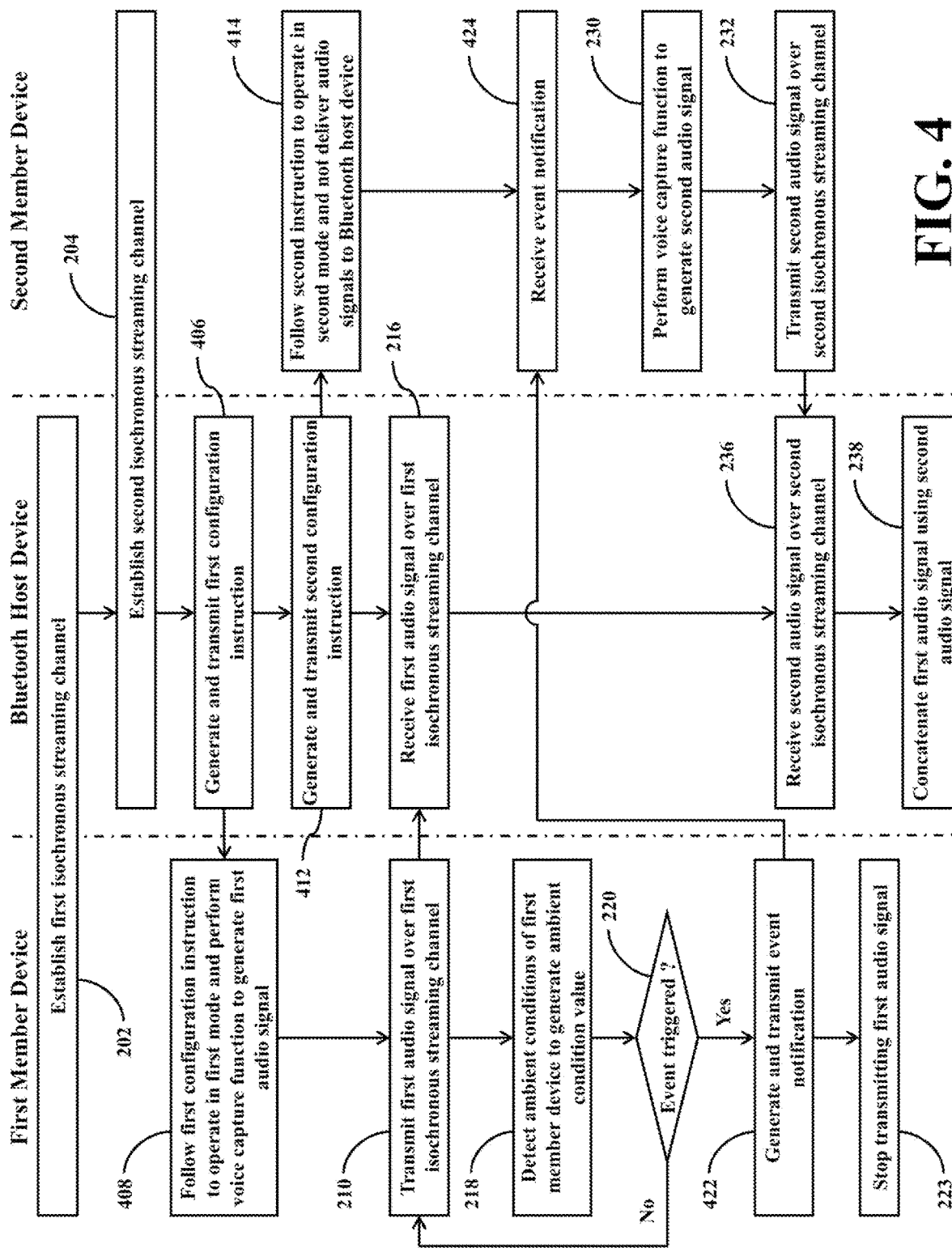
FIG. 4 shows a simplified flowchart of a voice input handover method according to another embodiment of the present disclosure.

The operations of the Bluetooth communication system 100 will be further explained in combination with FIG. 4. FIG. 4 is a simplified flowchart of the voice input handover method according to an embodiment of the present disclosure.

In the embodiment of FIG. 4, each of the first member device 120 and the second member device 130 in the Bluetooth communication system 100 operates in the first mode at the same time. In this case, the voice input handover method is detailed as follows.

Firstly, in operation 202, the Bluetooth host device 110 and the first member device 120 establish a first isochronous streaming channel 129 on the basis of the BLE audio technology. Thereafter, in operation 204, the Bluetooth host device 110 and the second member device 130 establish a second isochronous streaming channel 139 on the basis of the BLE audio technology. Details of operations 202 and 204 and the basic principle of isochronous stream channel have been described in the aforementioned embodiments of FIGS. 2 and 3, and hence are not repeated herein.

In operation 406, the Bluetooth host device 110 generates and transmits the first configuration instruction to the first member device 120. During operation, the processing circuit 115 in the Bluetooth host device 110 is further arranged to utilize the host-side communication circuit 111 to transmit the first configuration instruction to the first member device 120. On the other hand, in operation 408, the first member device 120 receives the first configuration instruction, and follows the first configuration instruction to operate in the first mode, and to perform a voice capture function to generate the first audio signal.

In operation 412, the processing circuit 115 in the Bluetooth host device 110 is arranged to utilize the host-side communication circuit 11 to transmit the second configuration instruction to the second member device 130. In operation 414, after the second communication circuit 133 of the second member device 130 receives the second configuration instruction, the second control circuit 135 follows the second configuration instruction to configure the second member device 130 to operate in the first mode but does not carry out any voice input operation which delivers audio signals to the Bluetooth host device 110.

It can be understood that the voice input operation described in the embodiment comprises the following essential steps: capturing voice by the first voice capturing circuit 164/second voice capturing circuit 174, encoding the captured voice by the first audio processing circuit 127/second audio processing circuit 137 to generate the first/second audio signal, and delivery of the first/second audio signal to the Bluetooth host device 110 through the first communication circuit 123, the second communication circuit 133, or any other approach. When any of the described essential steps is stopped, no audio signal is delivered to the Bluetooth host device 110. In other words, the voice input operation can be stopped by turning off the audio receiving circuit/microphone, or not using the communication circuit to transmit voice data even if the voice capturing circuit/microphone is turned on.

To summarize operations 202, 204, 406 and 412, the first member device 120 and the second member device 130 are arranged to operate in the first mode at the same time, that is, both have the permission to transmit audio signals, but only one of the member devices actually commences the transmission. It can be understood that the sequential orders of operations 202, 204, 406, and 412 are not limited to of the described embodiment. In principle, subsequent operations can wait until operations 408 and 414 are confirmed. The following operations 210, 216, 218 and 220 are substantially analogous to the embodiments of FIGS. 2 and 3, and hence the details are not repeated herein.

When the first control circuit 125 of the first member device 120 detects a trigger event in operation 220, operation 422 can be carried out to generate an event notification which is thereafter transmitted via the first communication circuit 123. Meanwhile, the event notification is directly transmitted to the second member device 130. After operation 422, the first member device 120 may directly proceed to operation 223, to stop the currently ongoing voice input operation which delivers the first audio signal to the Bluetooth host device 110.

As one of the highlight features in the embodiment, a direct wireless communication protocol can be employed in a connection between the first member device 120 and the second member device 130 to transmit the event notification. Since the first member device 120 and the second member device 130 are already operated in the first mode respectively, both have been configured with the permission to transmit captured voice data. The embodiment is able to achieve the voice input handover by direct wireless communication and coordination between the first member device 120 and the second member device 130. In other words, the voice input handover operation of the embodiment may not require the intervention of the Bluetooth host device 110. The direct wireless communication between the first member device 120 and the second member device 130 may be realized by, but is not limited to, the Bluetooth communication protocol.

Additionally in the embodiment, the event notification is regarded as a packet carrying event information, and can be understood as a voice input handover request or instruction. The packet of the event notification is generally compact in size, and can be transmitted in a low-cost way, such as a simple broadcast and acknowledgement. However, it can be understood that, regardless of what kind of communication protocol used to implement the direct communication, the second control circuit 135 in the second member device 130 can be configured in advance to monitor and identify the state of the event notification via the second communication circuit 133. Further embodiments can be derived from operations 406 and 412 of FIG. 4, wherein the first configuration instruction and the second configuration instruction may be arranged to carry specific configuration information, allowing the first member device 120 and the second member device 130 to gain the ability to directly communicate with each other after respectively receiving the first configuration instruction and the second configuration instruction.

In operation 424, after receiving the event notification sent by the first member device 120, the second member device 130 follows the instruction in the event notification to start a new voice input operation in place of the original one performed in the first member device 120. Thereafter, the first member device 120 performs operations 230 and 232, and the Bluetooth host device 110 proceeds to operations 236 and 238. The details of operations 230, 232, 233, 236, and 238 are substantially analogous to the aforementioned embodiments of FIGS. 2 to 3, and hence are not repeated herein.

To prevent the continuity of voice stream from being affected by the voice input handover, the timing for the first member device 120 and the second member device 130 to commence the voice input handover is further calculated. In a specific embodiment, the first member device 120 and the second member device 130 may negotiate through specific information exchanges in the process of direct communication to determine a timing for handover. For example, in operation 222, when an event notification is generated by first control circuit 125, a timing sequence information is embedded in the event notification. The aforementioned timing sequence information may be any kind of time synchronization information, timestamp, packet sequence number, event number, etc. commonly used in the CIS channel. The first member device 120 and the second member device 130 are arranged to utilize the same timing sequence information to determine the best timing for handover, such as a predetermined time slot. Therefore, the voice input handover is performed when the time comes to the predetermined time slot, that is, the first member device 120 stops the original voice input operation, and the second member device 130 starts a new voice input operation.

In an alternative implementation, since the first member device 120 and the second member device 130 are operated in the same CIG, there is some basic time synchronization information shared between the first isochronous streaming channel 129 and the second isochronous streaming channel 139. Based on the shared time synchronization information, the first member device 120 may be able to directly provide a predetermined time slot when issuing an event notification in operation 422, so that the first member device 120 and the second member device 130 are arranged to perform voice input handover in the predetermined time slot, that is, to respectively switch their voice capture functions at the same time.

In another embodiment, each of the first member device 120 and the second member device 130 is operated in first mode and granted with permissions to transmit audio signals to the Bluetooth host device 110. When the second processing circuit 135 of the second member device 130 receives the event notification transmitted from the first member device 120 via the second communication circuit 133 in operation 424, operation 230 may be instantly processed, wherein the second voice capturing circuit 174 is activated to start generating the second audio signal.

In an alternative embodiment, when the second processing circuit 135 of the second member device 130 receives the event notification transmitted from the first member device 120 via the second communication circuit 133 in operation 424, operations 230 and 232 are further arranged to be instantly processed, wherein the second voice capturing circuit 174 is activated to generate the second audio signal which is then transmitted over the second isochronous streaming channel 139.

In a further embodiment, after the first member device 120 transmits an event notification in operation 422, the first member device 120 may spontaneously determine a delay time, and processes operation 223 to stop the voice input operation after the delay time.

From the aforementioned embodiment in FIG. 4, at least the following advantages are highlighted. Unlike the embodiments in FIG. 2 and FIG. 3, the first member device 120 and the second member device 130 in the embodiment are arranged to operate in the first mode from the beginning. Therefore, when an event is triggered which requires a voice input handover, the second member device 130 does not need to spend time switching from second mode to first mode. The first communication circuit 123 and the second communication circuit 133 are able to perform direct wireless communicate with each other, such that the responsiveness of the voice input handover operation is improved. In the process, the exchange of timing sequence information allows the respective voice input functions to be synchronously switched. Alternatively, there may be a brief moment where both the first member device 120 and the second member device 130 are transmitting audio signals to the Bluetooth host device 110, thereby, the Bluetooth host device 110 is able to seamlessly concatenate the first audio signal with the second audio signal in operation 238.

Figure 5:
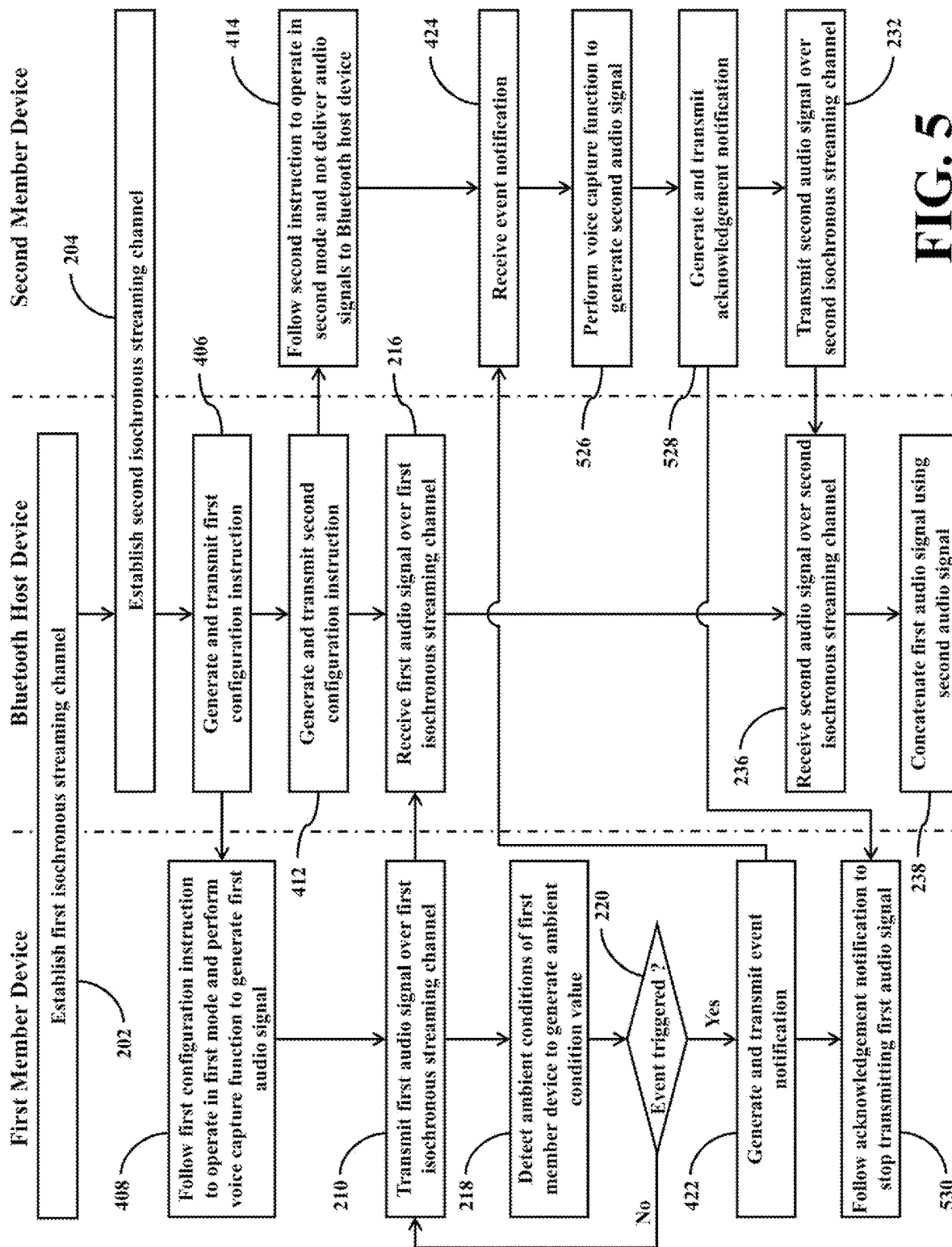
FIG. 5 shows a simplified flowchart of a voice input handover method according to another embodiment of the present disclosure.

The operations of the Bluetooth communication system 100 will be further explained in combination with FIG. 5. FIG. 5 is a simplified flowchart of the voice input handover method according to an embodiment of the present disclosure. The embodiment is a method further derived from the embodiment of FIG. 4, particularly applicable to a scenario wherein the first member device 120 does not need to be disconnected or turned off immediately after an event. Operations 202 to 424 are analogously processed as the previous embodiment, and thereafter, different implementations begin after operation 424.

After the second member device 130 receives the event notification in operation 424, in operation 526, the second control circuit 135 controls the second voice capturing circuit 174 according to the received event notification. At this stage, the second voice capturing circuit 174 may start to capture voice, and the second audio processing circuit 137 begins to convert and digitize the captured voice into a second audio signal. However, the second control circuit 135 does not yet utilize the second communication circuit 133 to transmit the second audio signal to the Bluetooth host device 110 over the second isochronous streaming channel 139.

In operation 528, the second control circuit 135 in the second member device 130 is arranged to generate an acknowledgement notification after the second communication circuit 133 receives the event notification, and utilize the second communication circuit 133 to transmit the acknowledgement notification to the first member device 120

In operation 530, after the first communication circuit 123 receives the acknowledgement notification, the first control circuit 125 in the first member device 120 is directed by the acknowledgement notification to stop transmitting the first audio signal via the first communication circuit 123.

That is, when the first member device 120 sends an event notification in operation 422, the voice input operation therein is not stopped until a confirming response is transmitted from the second member device 130.

Upon conclusion of operation 528, the second member device 130 proceeds to operation 232, rendering the Bluetooth host device 110 to process operations 236 and 238.

The timing sequence information, like the embodiment of FIG. 4, is further shared between the first member device 120 and the second member device 130 to obtain a consent of a timing for the voice input handover. In practice, the first member device 120 may embed timing sequence information in the event notification sent in operation 422. The second member device 130 is arranged to calculate a predetermined time slot according to timing sequence information to process operation 232. In an alternative embodiment, the first member device 120 may embed the predetermined time slot in the event notification sent in operation 422, such that the second member device 130 is implicitly arranged to start processing operation 232 in the predetermined time slot.

Alternatively, when the second member device 130 determines the aforementioned predetermined time slot according to the timing sequence information, the second member device 130 is further arranged to tell the first member device 120 the predetermined time slot when transmitting the acknowledgement notification in operation 528, such that the first member device 120 is configured by the acknowledgement notification to process operation 530 in the predetermined time slot, wherein the voice input operation is stopped.

After the first member device 120 and the second member device 130 agreed the predetermined time slot in any way, operation 530 is processed in the predetermined time slot by the first control circuit 125 of the first member device 120. On the other hand, operation 232 is processed by the second control circuit 135 of the second member device 130 starting from the predetermined time slot. Alternatively, after receiving the event notification in operation 424, the second control circuit 135 of the second member device 130 may proceed to operation 526 in advance, and does not start operation 232 until the predetermined time slot.

In another aspect of the embodiment, when the predetermined time slot is arranged, the first member device 120 and the second member device 130 may be deliberately arranged with an overlap for a brief moment. That is, operation 232 is arranged to be processed before operation 530. In this way, there might be a short moment where the operations 216 and 236 are processed at the same time by the Bluetooth host device 110. That is, audio signals from two member devices are simultaneously received. In this way, the voice call is better ensured uninterruptable when the Bluetooth host device 110 uses the second audio signal to concatenate the first audio signal in operation 238.

As for operations 232, 236 and 238, which have been described in the aforementioned embodiments, details are not repeated herein.

From the foregoing description, at least the following advantages are highlighted based on the embodiment of FIG. 5. The direct communication between the first member device 120 and the second member device 130 is derived into a two-way direct communication, that is, the second member device 130 can respond to the first member device 120 with an acknowledgement notification. The two-way communication provides better time synchronization, improved handover efficiency, and the ability to cope with various complex exceptions. For example, if the first member device 120 does not receive the expected acknowledgement notification in the middle of the voice input handover, it is implicitly suggested that the second member device 130 may have a problem. In this case, the first member device 120 may choose not to stop the currently ongoing voice input operation to ensure that the two-way voice call of the Bluetooth communication system 100 is not interrupted. With improved accuracy in synchronization, the voice input functions on either side are switched with better power efficiency, and the concatenated voice stream generated by the Bluetooth host device 110 in operation 238 can have better smoothness.

Figure 6:
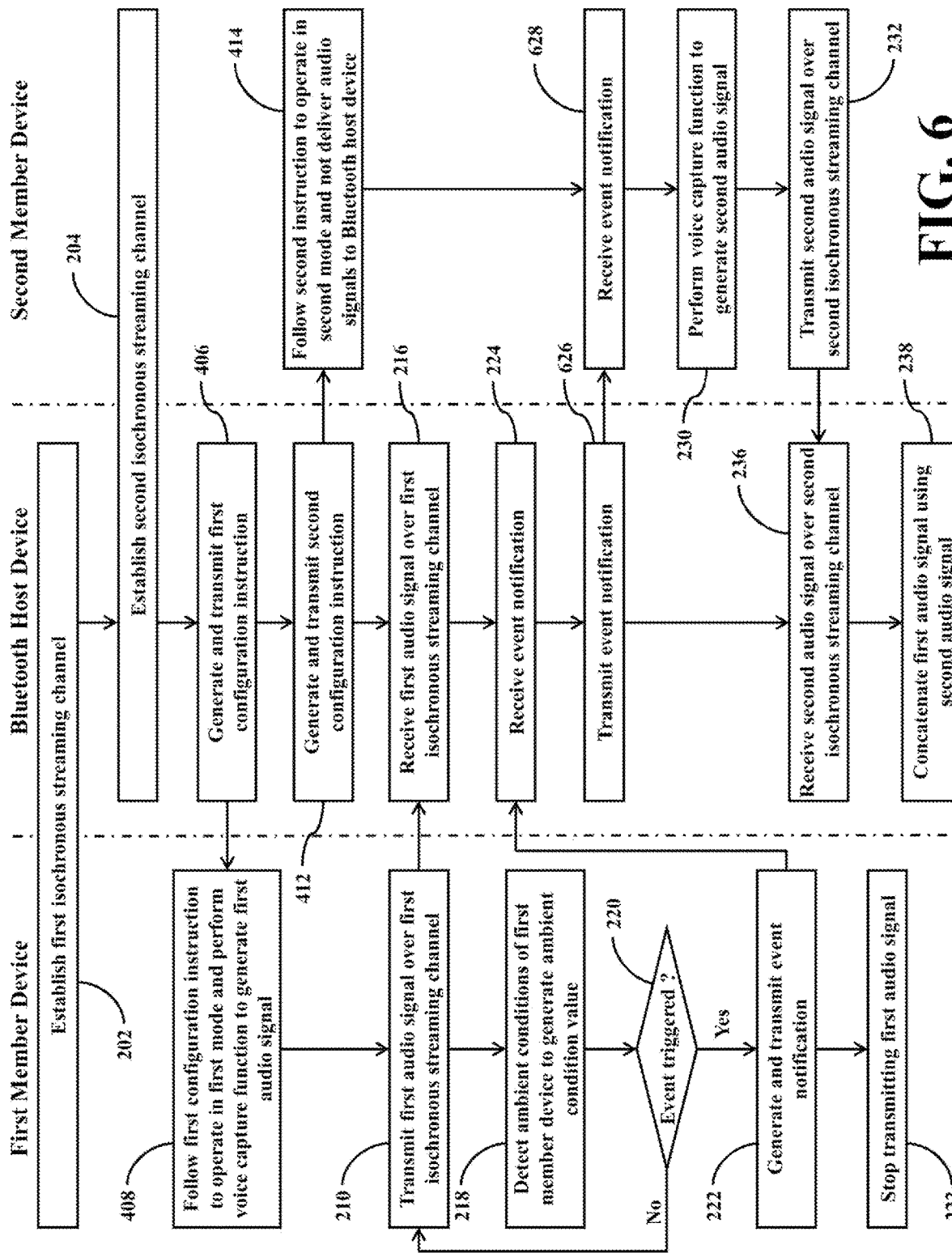
FIG. 6 shows a simplified flowchart of a voice input handover method according to another embodiment of the present disclosure.

The operations of the Bluetooth communication system 100 will be further explained in combination with FIG. 6. FIG. 6 is a simplified flowchart of the voice input handover method according to an embodiment of the present disclosure. The embodiment is a further modification derived from the embodiment of FIG. 4. The first member device 120 and the second member device 130 operate in the first mode, and the timing to handover is determined through the event notification. The case is different for there is no direct communication mechanism between the first member device 120 and the second member device 130, and it is necessary to rely on the Bluetooth host device 110 to transmit the event notification.

In the embodiment, operations 202, 204, 406, 408, 210, 412, 414, 216, 218, 220 and 224 are substantially analogous to those in the embodiment of FIG. 4, and hence the details are not repeated herein. In operation 224, after the Bluetooth host device 110 receives the event notification, the derived subsequent operations begin to be different.

In the scenario of FIG. 6, the processing circuit 115 in the Bluetooth host device 110 is arranged to utilize the host-side communication circuit 11*l* to forward messages for the second member device 130 transmitted from the first member device 120, or messages for the first member device 120 transmitted from the second member device 130. For example, in operation 626, Bluetooth host device 110 transmits the event notification received from first member device 120 to second member device 130.

In operation 628, after the second communication circuit 133 receives the event notification, the second control circuit 135 in the second member device 130 is aware of the situation that a voice input handover is required, and thereafter, operation 230 is processed. In operation 230, the second control circuit 135 controls the second audio processing circuit 137 to convert the voice captured by the second voice capturing circuit 174 into the second audio signal.

Through exchange of timing sequence information, the embodiment further provides the ability to confirm a function switch timing for the first member device 120 and the second member device 130. For example, when the Bluetooth host device 110 forwards an event notification in operation 626, the first control circuit 125 may further embed timing sequence information in the event notification.

The timing sequence information may be determined in operation 224 by Bluetooth host device 110, or in operation 222 the first member device 120. As for the second member device 130, when the timing sequence information is received in operation 628, the second member device 130 is able to perform a self-reference with existed time-related parameters to determine the timing to start the voice input operation. For example, the second member device 130 may determine a predetermined time slot according to the timing sequence information, and start performing operation 232 in the predetermined time slot. That is, the second control circuit 135 in the second member device 130 is arranged to utilize the second communication circuit 133 to start transmitting the second audio signal to the Bluetooth host device 110 over the second isochronous streaming channel 139 only when the predetermined time slot arrives.

At least the following advantages in the embodiment of FIG. 6 are revealed based on the aforementioned description. Both the first member device 120 and the second member device 130 are arranged to operate in the first mode, so the voice input function may be rapidly switched on when needed, and there is no need to perform the operation mode switching through the Bluetooth host device 110. The timing for voice input function switching is the only factor the first member device 120 and the second member device 130 need to work out. The event notification of the embodiment is transmitted through the Bluetooth host device 110. Therefore, no additional resources are needed to establish a wireless channel for direct communication between first member device 120 and the second member device 130.

Figure 7:
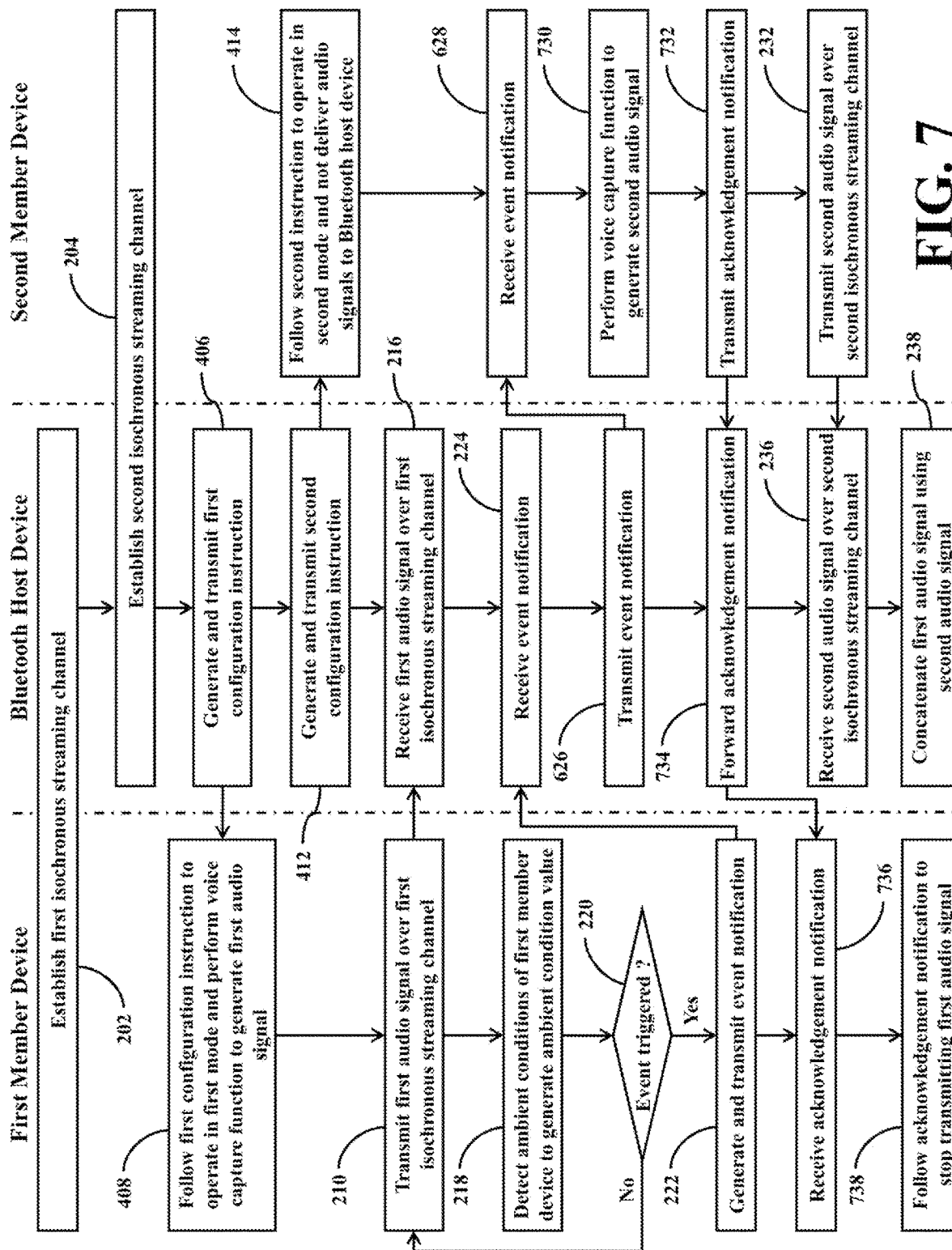
FIG. 7 shows a simplified flowchart of a voice input handover method according to another embodiment of the present disclosure.

The operations of Bluetooth communication system 100 will be further explained in combination with FIG. 7. FIG. 7 is a simplified flowchart of a voice input handover method according to an embodiment of the present disclosure. The embodiment is a variation further derived from the embodiment of FIG. 6. The case is substantially analogous to the embodiment in FIG. 5, wherein a mechanism for transmitting the acknowledgement notification is introduced, so that the voice input handover between the first member device 120 and the second member device 130 is better adaptable to complex situations while ensuring a successful handover.

In FIG. 7, operations 202 to 628 are the same as the embodiment of FIG. 6 and will not be repeated herein. In operation 628, after the second member device 130 receives the event notification sent from the Bluetooth host device 110, the subsequent procedures are varied as follows.

In operation 730, after the second communication circuit 133 receives the event notification, the second control circuit 135 of the second member device 130 is arranged to control the second audio processing circuit 137 to convert the voice captured by the second voice capturing circuit 174 into the second audio signal. It should be noted that at this stage, the second voice capturing circuit 174 only starts to capture voice, but the second control circuit 135 does not yet deliver the captured voice data to the Bluetooth host device 110 via the second communication circuit 133.

In operation 732, after the second communication circuit 133 receives the event notification, the second control circuit 135 in the second member device 130 is arranged to generate an acknowledgement notification, and utilize the second communication circuit 133 to transmit the acknowledgement notification to the Bluetooth host device 110. In operation 734, after the host-side communication circuit 111 receives the acknowledgement notification, the processing circuit 115 in the Bluetooth host device 110 utilizes the host-side communication circuit 111 to forward the acknowledgement notification to the first member device 120.

In operation 736, the first member device 120 receives the acknowledgement notification forwarded by the Bluetooth host device 110. In operation 738, after the first communication circuit 123 receives the acknowledgement notification, the first control circuit 125 in the first member device 120 stops transmitting the first audio signal via the first communication circuit 123 according to the acknowledgement notification.

In the second member device 130, operation 232 is processed only after operation 732 is completed. The second control circuit 135 utilizes the second communication circuit 133 to transmit the second audio signal generated in operation 730 to the Bluetooth host device 110.

Like the embodiment of FIG. 5, the timing sequence information is further arranged to be shared between the first member device 120 and the second member device 130 in FIG. 7, so that a consent of the timing for voice input handover is obtained. In practice, the first member device 120 may be arranged to embed timing sequence information in the event notification generated in operation 222. In another embodiment, timing sequence information may be provided by the Bluetooth host device 110 in operation 626. As for the second member device 130, as long as the timing sequence information is received, operation 232 may be accordingly processed on a predetermined time slot calculated therefrom. Alternatively, the predetermined time slot may be determined by the first member device 120 when the event is triggered, which is delivered to the second member device 130 when the event notification is transmitted in operation 222. In any way, operation 232 may be accordingly started in the predetermined time slot calculated therefrom.

In a further embodiment, in the case that the predetermined time slot is determined by the second member device 130 according to the timing sequence information, the second control circuit 135 is further arranged to tell the first member device 120 the predetermined time slot when transmitting the acknowledgement notification in operation 732. As such, the first control circuit 125 is arranged to stop the voice input operation in operation 738 in the predetermined time slot according to the acknowledgement notification.

After the first member device 120 and the second member device 130 decide the predetermined time slot in any way, operation 738 is processed in the predetermined time slot by the first member device 120. On the other hand, operation 232 is processed by the second member device 130 starting from the predetermined time slot. For example, operation 232 is started by the second control circuit 135 of the second member device 130 only when the predetermined time slot arrives, wherein the second communication circuit 133 is utilized to transmit the second audio signal to the Bluetooth host device 110 over the second isochronous streaming channel 139.

As for subsequent operations 232, 236 and 238, which have been described in the aforementioned embodiments, details are repeated herein.

The embodiment combines several advantages rendered from the aforementioned embodiments. Both the first member device 120 and the second member device 130 are arranged to operate in the first mode, so the voice input functions may be rapidly switched when needed, and there is no need to change the operation mode through the Bluetooth host device 110. As for the first member device 120 and the second member device 130, the timing to perform the voice input handover may be coordinated through the Bluetooth host device 110. The event notification of the embodiment is transmitted through the Bluetooth host device 110. Therefore, no additional resources are needed to establish a wireless channel for direct communication between first member device 120 and the second member device 130. In the process of coordinating the timing for handover, the second member device 130 can respond to the first member device 120 with an acknowledgement notification to ensure a successful handover. With the efficiency improvement in the voice input handover, power efficiency is also improved, and the smoothness of a concatenated voice stream generated by the processing circuit 115 in operation 238 is improved.

Figure 8:
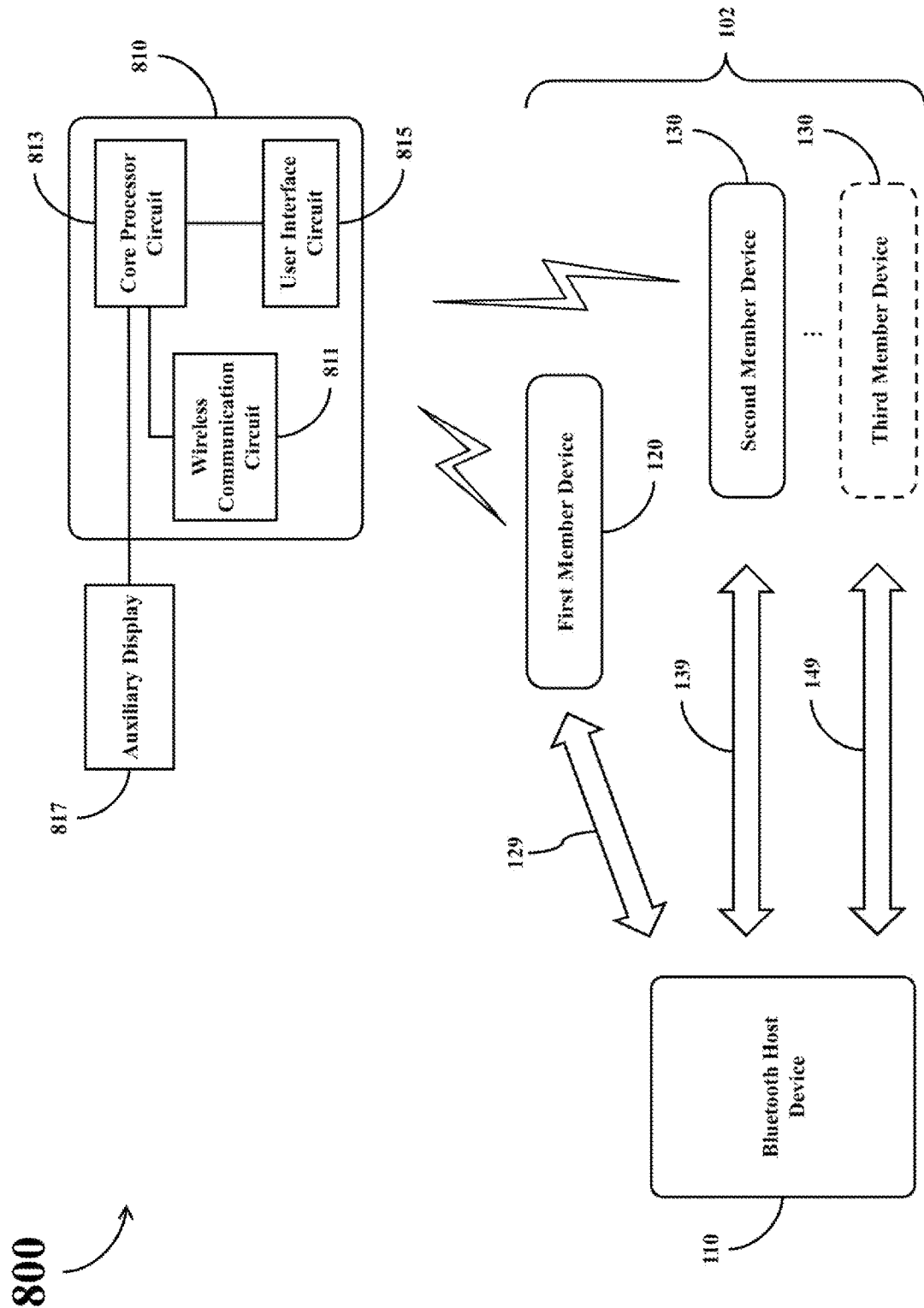
FIG. 8 shows a simplified functional block diagram of a Bluetooth communication system according to another embodiment of the present disclosure.

FIG. 8 is a simplified functional block diagram of Bluetooth communication system 800 according to another embodiment of the present disclosure. The Bluetooth communication system 800 comprises a Bluetooth host device 110 and a Bluetooth device set 102. Wherein the Bluetooth device set 102 may include a plurality of member devices.

Unlike the Bluetooth communication system 100 in FIG. 1, the embodiment further considers the scenario when a third-party device 810 is a part of the Bluetooth communication system 800, and therefore the details of interactive operations with the member devices in the Bluetooth host device 110 and the Bluetooth device set 102 are explored. The schematic details of the Bluetooth host device 110, the first member device 120, the second member device 130, and the third member device 140 are not repeated herein. The architecture details and operations of the third-party device 810 are described as follows.

In the embodiment of FIG. 8, the third-party device 810 comprises at least a wireless communication circuit 811, a user interface circuit 815, and a core processor circuit 813. The wireless communication circuit 811 is arranged to receive and transmit various Bluetooth wireless packets. The user interface circuit 815 is arranged to receive various operation instructions issued by users. The core processor circuit 813 is coupled with the wireless communication circuit 811 and the user interface circuit 813. The core processor circuit 813 is arranged to generate various packets to be transmitted through the wireless communication circuit 811, and decode various packets received by the wireless communication circuit 811 to obtain relevant data or instructions. The core processor circuit 813 is further arranged to control the operation of the third-party device 810 according to various operation instructions issued by the user through the user interface circuit 813. On the other hand, the third-party device 810 may also include a display interface (not shown), which displays the screen under the control of the core processor circuit 813 to facilitate user interaction.

In the embodiment, the third-party device 810 is arranged to help the first member device 120 and the second member device 130 wirelessly communicate with each other. That is, the third-party device 810 is technically acting as a message forwarder. In practical applications, the third-party device 810 may support the BLE audio technology regulated by the Bluetooth Core Specification Version 5.2 or later.

In some embodiments, the wireless communication circuit 811 of the third-party device 810 is further arranged to operably adopt various wired network transmission technologies or various Radio Access Technologies (RATs) to receive the voice data transmitted from a remote device (not shown in figures) through various networks (e.g., Internet, mobile communication networks, or various private networks). The core processor circuit 813 is arranged to operably decode the event notification sent by the first member device 120in the Bluetooth device set 102, and utilize the wireless communication circuit 811 to forward the event notification to the second member device 130.

In practice, the wireless communication circuit 811 in the third-party device 810 may be realized by an appropriate wireless transmission circuit supporting the Bluetooth communication protocol specified by the Bluetooth Core Specification Version 5.2 or later. Alternatively, the wireless communication circuit 811 may be realized with various hybrid communication circuits supporting above Bluetooth communication protocol and also supporting the aforementioned wired network transmission technologies or RATs. If needed, the wireless communication circuit 811 may be coupled with an additional antenna (not shown in figures).

The user interface circuit 815 may be realized by various appropriate circuits that is arranged to receive user instructions, such as a keyboard, a mouse, a touch screen, a voice control device, a gesture sensing device, or a combination of various devices.

The core processor circuit 813 may be realized with an appropriate packet demodulation circuit, a digital computing circuit, a microprocessor, an ASIC, a single processor module, a combination of multiple processor modules, a single computer system, a combination of multiple computer systems, a single server, a combination of multiple servers, or a cloud computing system having appropriate computing capabilities and capable of parsing and generating Bluetooth packets adopting the BLE Audio technology specified by the Bluetooth Core Specification Version 5.2 or newer versions.

In practical applications, the different function blocks in the aforementioned third-party device 810 may be realized by different circuits, or may be integrated into a single circuit chip or a single device For example, the user interface circuit 815 may be integrated into the core processor circuit 813. For another example, the user interface circuit 815 and a display device may be integrated into a single touch screen.

Alternatively, all functional blocks of the third-party device 810 may be integrated into a single IC chip, a mobile communication device (e.g., a cell phone), a wearable device, a tablet computer, a notebook computer, a desktop computer, an audio broadcast system, a voice guidance system, a voice broadcasting system, a vehicular communication device, a satellite communication device, a smart TC, a Bluetooth smart speaker, or the like.

When the Bluetooth host device 110 and the member devices in the Bluetooth device set 102 support the BLE Audio technology, the user may utilize the Bluetooth communication system 800 to conduct various audio playback operations adopting the BLE Audio technology to reduce the power consumption of the Bluetooth communication system 800 while improving the overall audio playback quality.

Figure 9:
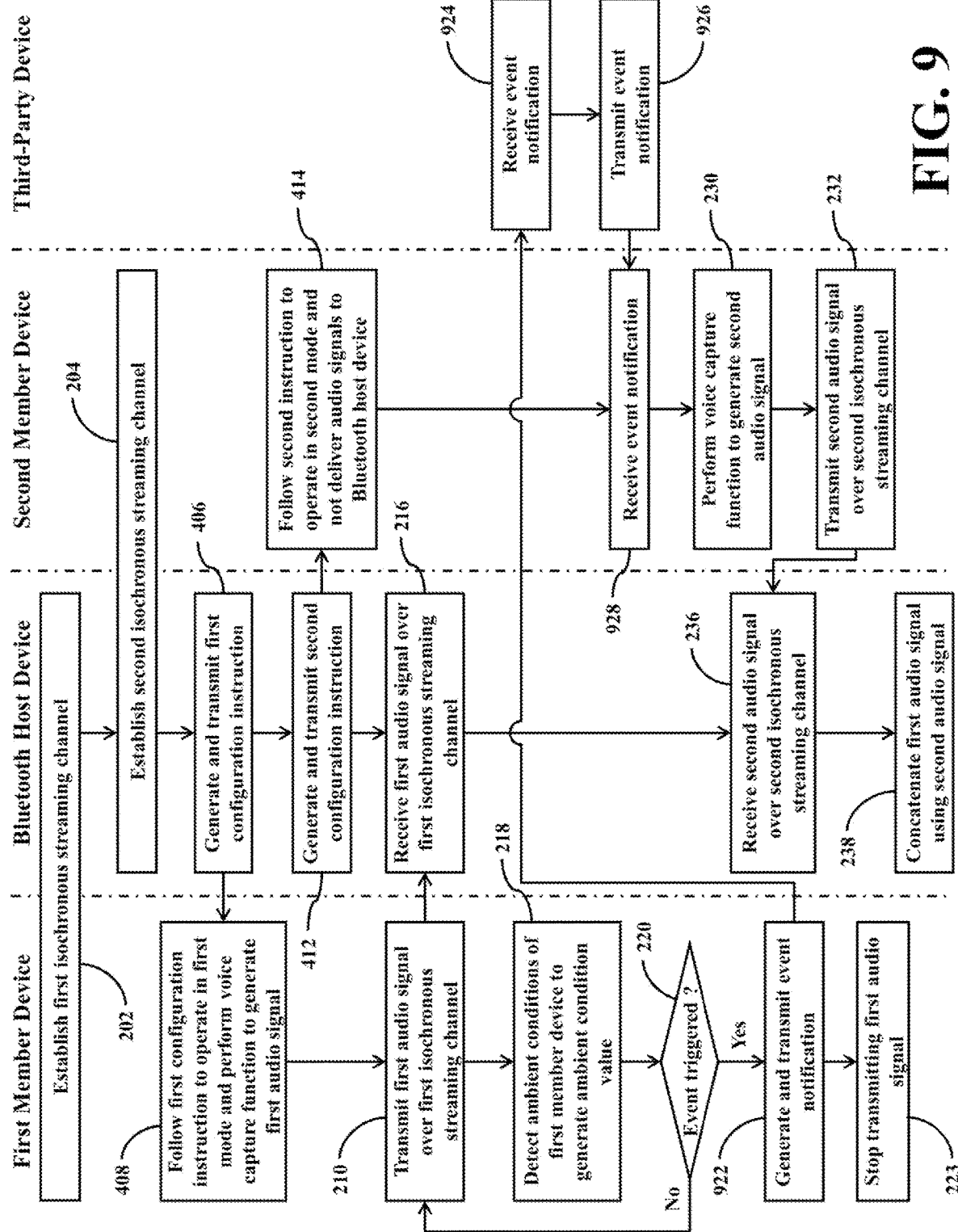
FIG. 9 shows a simplified flowchart of a voice input handover method according to another embodiment of the present disclosure.

The operations of Bluetooth communication system 800 will be further explained in combination with FIG. 9. FIG. 9 is a simplified flowchart of the voice input handover method according to an embodiment of the present disclosure. Based on the Bluetooth communication system 800 architecture of FIG. 8, different operations are generated between the first member device 120 and the second member device 130. The embodiment is particularly appropriate for applications where direct communication between first member device 120 and the second member device 130 is infeasible. In this case, if the first member device 120 and the second member device 130 are both wirelessly connectable to a common third-party device, the embodiment may be adapted to realize the voice input handover. Generally, the first control circuit 125 of the first member device 120 of the embodiment is arranged to utilize the first communication circuit 123 to transmit messages for the second member device 130 to the third-party device 810, or receive messages to be transmitted from the second member device 130 to the first member device 120 via the third-party device 810. On the other hand, the second control circuit 135 of the second member device 130 is arranged to utilize the second communication circuit 133 to transmit messages for the first member device 120 to the third-party device 810, or receive messages to be transmitted from the first member device 120 to the second member device 130 via the third-party device 810.

In the embodiment of FIG. 9, operations 202, 204, 406, 408, 210, 412, 414, 216, 218 and 220 are arranged to operate analogously as the embodiment of FIG. 4. In summary, after the aforementioned operations are completed by the first member device 120 and the second member device 130, isochronous streaming channels are respectively established with the Bluetooth host device 110, and both member devices are simultaneously operated in the first mode. The first member device 120 performs the voice input operation, while the second member device 130 does not perform the voice input operation. The Bluetooth host device 110 receives the first audio signal transmitted by the first member device 120.

After an event is triggered in operation 220, the first member device 120 generates and sends an event notification to the third-party device 810 in operation 922. More specifically, the first control circuit 125 in the first member device 120 is arranged to generate an event notification when the ambient condition value meets a triggering condition, and transmit the event notification to the third-party device 810 via the first communication circuit 123.

In operation 924, the third-party device 810 receives the event notification. Thereafter, in operation 926, the third-party device 810 transmits the event notification to the second member device 130. More specifically, the core processor circuit 813 in the third-party device 810 is arranged transmit the event notification to the second member device 130 using the wireless communication circuit 811 after the wireless communication circuit 811 receives the event notification from the first member device 120.

In operation 928, the second member device 130 receives the event notification from the third-party device 810 and performs subsequent operations 230 and 232. More specifically, after the second communication circuit 133 receives the event notification, the second control circuit 135 in the second member device 130 is arranged to control the second audio processing circuit 137 to convert the voice captured by the second voice capturing circuit 174 into the second audio signal.

After receiving the second audio signal transmitted by the second member device 130, operations 236 and 238 are processed by the Bluetooth host device 110. On the other hand, operation 223 is processed by the first member device 120 after operation 922 is completed, wherein the voice input operation is stopped. The details of operations 230, 232, 236, 238 and 223 are substantially analogous to the aforementioned embodiments, and therefore are not repeated herein.

In the embodiment, the third-party device 810 is defined as not a member of the Bluetooth device set 102. Therefore, the wireless connection between the first member device 120 may be realized in various ways. For example, the first member device 120 and the second member device 130 may respectively establish independent wireless connections with the third-party device 810 in advance, allowing the third-party device 810 to forward messages. The event notification may be a packet carrying event information. The packet of the event notification is generally compact in size, and may be transmitted in a low-cost way, such as a simple broadcast and acknowledgement. However, it should be understood that any implementation is based on a premise that the third-party device 810 is capable and willing to provide the message forwarding service. For example, the core processor circuit 813 in the third-party device 810 may be configured in advance to monitor and identify the status of any event notification through the wireless communication circuit 811.

On the other hand, the first member device 120 and the second member device 130 may negotiate through specific information exchanges to determine a timing for handover. For example, in operation 922, when the first control circuit 125 generates an event notification, a timing sequence information may be embedded in the event notification. The timing sequence information may be referred to as any essential time synchronization information commonly used in the CIS channel, such as timestamp, packet sequence number, event number, and etc. The timing sequence information will be transferred to the second member device 130 along with the event notification, allowing the first member device 120 and the second member device 130 to use the same timing sequence information to determine the best timing for switching, such as calculating a predetermined time slot. Therefore, when the predetermined time slot arrives, the first member device 120 stops the currently ongoing voice input operation, and the second member device 130 starts a new voice input operation.

In an alternative implementation, since the first member device 120 and the second member device 130 are operated in the same CIG, there is some basic time synchronization information shared between the first isochronous streaming channel 129 and the second isochronous streaming channel 139. Based on the shared time synchronization information, the first member device 120 may be able to directly provide a predetermined time slot when issuing an event notification in operation 922, so that the first member device 120 and the second member device 130 are arranged to respectively switch voice input functions in the predetermined time slot.

In a specific example, when the first member device 120 processes operation 223 in the predetermined time slot, the first control circuit 125 is arranged to stop transmitting the first audio signal via the first communication circuit 123, so as to stop the voice input operation.

For another example, only when the predetermined time slot is arrived, operation 232 is processed by the second control circuit 135 of the second member device 130. In operation 232, the second control circuit 135 utilizes the second communication circuit 133 to transmit the second audio signal to the Bluetooth host device 110 over the second isochronous streaming channel 139.

At least the following advantages are revealed from the aforementioned embodiment. Based on the BLE audio technology, the quality of the two-way voice communication is guaranteed. The first member device 120 and the second member device 130 are arranged to simultaneously operate in the first mode at the beginning, so there is no need to spend time switching modes when handover is required. In addition, forwarding event notification by a third-party device is particularly applicable for solving the problem of voice input handover in some particular network environment. In practice, the core processor circuit 813 in the third-party device 810 is arranged to utilize the wireless communication circuit 811 to transfer the event notification that the first member device wants to deliver to the second member device. The embodiment is adaptable when the first member device 120 and the second member device 130 are arranged to operate in some environments where direct communication is infeasible, but both are simultaneously connectable to the third-party device 810.

The operations of the Bluetooth communication system 800 will be further explained in combination with FIG. 10. FIG. 10 is a simplified flowchart of a voice input handover method according to an embodiment of the present disclosure. The embodiment is a variation further derived from the embodiment of FIG. 9. Operations 202 to 928 are substantially analogous to the aforementioned embodiment, and hence the details are not repeated herein. In operation 928, after the second member device 130 receives the event notification forwarded by the third-party device 810, subsequent operation 1030 begins to derive varied embodiments.

In operation 1030, the second member device 130 controls the second voice capturing circuit 174 according to the event notification. More specifically, after the second communication circuit 133 receives the event notification from the third-party device 810, the second control circuit 135 of the second member device 130 is arranged to turn on the second audio processing circuit 137 to convert the voice captured by the second voice capturing circuit 174 into the second audio signal. It should be noted that at this stage, the second voice capturing circuit 174 only starts to capture voice, but the captured voice data is not transmitted to the Bluetooth host device 110.

In operation 1032, the second control circuit 135 in the second member device 130 is arranged to generate an acknowledgement notification after the second communication circuit 133 receives the event notification, and utilize the second communication circuit 133 to transmit the acknowledgement notification to the third-party device 810. In operation 1034 and operation 1036, after receiving the acknowledgement notification, the core processor circuit 813 in the third-party device 810 is arranged to transmit the acknowledgement notification to the first member device 120 using the wireless communication circuit 811.

In operation 1038, the first control circuit 125 of the first member device 120 receives the acknowledgement notification forwarded by the third-party device 810 via the first communication circuit 123. In operation 1040, after the first communication circuit 123 receives the acknowledgement notification, the first control circuit 125 in the first member device 120 stops transmitting the first audio signal via the first communication circuit 123 according to the acknowledgement notification.

For the second member device 130, after operation 1032 is completed, operation 232 is processed by the second control circuit 135 in the second member device 130 only when the predetermined time slot arrives, wherein the second communication circuit 133 is utilized to transmit the second audio signal to the Bluetooth host device 110 over the second isochronous streaming channel 139.

Like the embodiment of FIG. 5, the timing sequence information is further arranged to be shared between the first member device 120 and the second member device 130 in FIG. 10, so that a consent of the timing for the voice input handover is obtained. In practice, the first member device 120 may be arranged to embed timing sequence information in the event notification generated in operation 922. As for the second member device 130, as long as the timing sequence information is received, operation 232 may be accordingly processed on a predetermined time slot calculated therefrom. Alternatively, the predetermined time slot may be determined by the first member device 120 when the event is triggered, which is delivered to the second member device 130 when the event notification is transmitted in operation 922. In any way, operation 232 may be accordingly processed in the predetermined time slot calculated therefrom.

In a further embodiment, in the case that the predetermined time slot is determined by the second member device 130 according to the timing sequence information, the second control circuit 135 is further arranged to tell the first member device 120 the predetermined time slot when transmitting the acknowledgement notification in operation 1032. As such, the first control circuit 125 of the first member device 120 is arranged to stop the voice input operation in operation 1040 in the predetermined time slot according to the acknowledgement notification.

As for the subsequent operations 232, 236 and 238, which have been described in the aforementioned embodiment, details are not repeated herein.

As can be seen from the foregoing description, the embodiment of FIG. 10 reveals at least the following advantages. Forwarding event notification by a third-party device is particularly applicable for solving the problem of voice input handover in some particular network environment. The embodiment is adaptable when the first member device 120 and the second member device 130 are arranged to operate in some environments where direct communication is infeasible, but both are simultaneously connectable to the third-party device 810. In the interactive operations using the third-party device 810, an acknowledgement notification is transmitted in response to the event notification, allowing the first member device 120 and the second member device 130 to better consolidate the timing of synchronous switching. With improved accuracy in synchronization, the voice input functions on either side may be switched with better power efficiency, and the concatenated voice stream generated by the Bluetooth host device 110 in operation 238 can have better smoothness.

In summary, the disclosure provides a variety of embodiments for the voice input handover operations not defined by the BLE audio technology under different scenarios. A wide range of scenarios are covered by the embodiments. For example, when a single user makes a two-way voice call with a TWS product, the left and right microphones may be switched in turn according to their usages. For another example, when there is a microphone on each desk in a meeting room of a plurality of people, one of the microphones may be activated according to the speaking person. Another example is in an indoor environment with multiple smart speakers distributed in many rooms, wherein the active microphone among the smart speakers may be switched according to the user presence.

The embodiment of the disclosure adopts the BLE isochronous channel technology and the low complexity communication codec (LC3) technology, so that ultra-low energy consumption and high-quality audio transmission may be realized in practical products. In addition to keeping the two-way voice call in a stable state without interruption, the embodiments also provide improvements in sound quality and power efficiency, whereby the user experience may be significantly improved.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to encompass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the disclosure will be apparent to those skilled in the art from consideration of the specification and practice of the disclosure disclosed herein. It is intended that the specification and examples be considered as exemplary only, with a true scope and spirit of the disclosure indicated by the following claims.

What is claimed is:

1. A Bluetooth communication system (100), comprising:
a Bluetooth host device (110), comprising:
a host-side communication circuit (111);
a processing circuit (115), coupled with the host-side communication circuit (111), and arranged to operably control the host-side communication circuit (111); and
a Bluetooth device set (102), comprising at least a first member device (120) and a second member device (130);
wherein the first member device (120) comprises:
a first audio processing circuit (127), coupled with a first voice capturing circuit, and arranged to operably convert voice captured by the first voice capturing circuit (164) into a first audio signal;
a first communication circuit (123), arranged to wirelessly communicate with the host-side communication circuit (111);
a first control circuit (125), coupled with the first communication circuit (123) and the first audio processing circuit (127), and arranged to operably control the first communication circuit (123) and the first audio processing circuit (127); and
a first sensor circuit (121), coupled with the first control circuit (125), and arranged to operably detect an ambient condition value of the first member device (120), and to operably transmit the ambient condition value to the first control circuit (125);
wherein the second member device (130) comprises:
a second audio processing circuit (137), coupled with a second voice capturing circuit (174), and arranged to operably convert voice captured by the second voice capturing circuit (174) into a second audio signal;

a second communication circuit (133), arranged to wirelessly communicate with the host-side communication circuit (111); and
a second control circuit (135), coupled with the second communication circuit (133) and the second audio processing circuit (137), and arranged to operably control the second communication circuit (133) and the second audio processing circuit (137);
wherein the processing circuit (115) is further arranged to operably utilize the host-side communication circuit (111) to establish a first isochronous streaming channel (129) with the first member device (120), and operably utilize the host-side communication circuit (111) to establish a second isochronous streaming channel (139) with the second member device (120);
wherein the processing circuit (115) is further arranged to operably utilize the host-side communication circuit (111) to transmit a first configuration instruction to the first member device (120), and transmit a second configuration instruction to the second member device (130);
wherein the first communication circuit (123) is further arranged to receive the first configuration instruction, and the first control circuit (125) is further arranged to operably follow the first configuration instruction to configure the first member device (120) to operate in a first mode, and to utilize the first communication circuit (123) to transmit the first audio signal to the Bluetooth host device (110) over the first isochronous streaming channel (129);
wherein the second communication circuit (133) is further arranged to operably receive the second configuration instruction, and the second control circuit (135) is further arranged to follow the second configuration instruction to operably configure the second member device (130) to operate in the first mode, and follow the second configuration instruction not to deliver the second audio signal to the Bluetooth host device (110) through the second communication circuit (133);
wherein the first control circuit (125) is further arranged to operably generate the event notification when the ambient condition value meets a triggering condition, and to operably transmit the event notification to the Bluetooth host device (110) via the first communication circuit (123); and
wherein the processing circuit (115) is further arranged to operably utilize the host-side communication circuit (111) to transmit the event notification to the second member device (130) after the host-side communication circuit (111) receives the event notification.

2. The Bluetooth communication system (100) of claim 1, wherein the second control circuit (135) is further arranged to operably control the second audio processing circuit (137) to convert voice captured by the second voice capturing circuit (174) into the second audio signal after the second communication circuit (133) receives the event notification.

3. The Bluetooth communication system (100) of claim 2, wherein the second control circuit (135) is further arranged to operably generate an acknowledgement notification after the second communication circuit (133) receives the event notification, and to operably utilize the second communication circuit (133) to transmit the acknowledgement notification to the Bluetooth host device (110);
wherein the processing circuit (115) is further arranged to operably utilize the host-side communication circuit (111) to transmit the acknowledgement notification to the first member device (120) after the host-side communication circuit (111) receives the acknowledgement notification; and
wherein the first control circuit (125) is further arranged to operably stop transmitting the first audio signal via the first communication circuit (123) according to the acknowledgement notification after the first communication circuit (123) receives the acknowledgement notification.

4. The Bluetooth communication system (100) of claim 3, wherein the processing circuit (115) is further arranged to operably embed a timing sequence information in the event notification when utilizing the host-side communication circuit (111) to transmit the event notification to the second member device (130); and
wherein the first control circuit (125) is further arranged to operably stop transmitting the first audio signal via the first communication circuit (123) since a predetermined time slot, wherein the predetermined time slot is determined based on the timing sequence information.

5. The Bluetooth communication system (100) of claim 3, wherein the first control circuit (125) is further arranged to operably embed the timing sequence information in the event notification when generating the event notification; and
wherein the second control circuit (135) is further arranged to operably utilize the second communication circuit (133) to transmit the second audio signal to the Bluetooth host device (110) over the second isochronous streaming channel (139) since the predetermined time slot.

6. A Bluetooth device set (102) for wirelessly communicating with a Bluetooth host device (110), the Bluetooth device set (102) comprising:
a first member device (120), comprising:
a first audio processing circuit (127), coupled with a first voice capturing circuit (164), and arranged to operably convert voice captured by the first voice capturing circuit (164) into a first audio signal;
a first communication circuit (123), arranged to operably establish a first isochronous streaming channel (129) with the Bluetooth host device (110), and to wirelessly communicate with the Bluetooth host device (110);
a first control circuit (125), coupled with the first communication circuit (123) and the first audio processing circuit (127), and arranged to operably control the first communication circuit (123) and the first audio processing circuit (127); and
a first sensor circuit (121), coupled with the first control circuit (125), and arranged to operably detect an ambient condition value of the first member device (120), and to operably transmit the ambient condition value to the first control circuit (125);
a second member device (130), comprising:
a second audio processing circuit (137), coupled with a second voice capturing circuit (174), and arranged to operably convert voice captured by the second voice capturing circuit (174) into a second audio signal;
a second communication circuit (133), arranged to operably establish a second isochronous streaming channel (139) with the Bluetooth host device (110), and to wirelessly communicate with the Bluetooth host device (110); and
wherein the first communication circuit (123) is further arranged to receive a first configuration instruction transmitted from the Bluetooth host device (110), and the first control circuit (125) is further arranged to follow the first configuration instruction to operably configure the first member device (120) to operate in a first mode, and to operably utilize the first communication circuit (123) to transmit the first audio signal to the Bluetooth host device (110) over the first isochronous streaming channel (129);

wherein the second communication circuit (133) is further arranged to operably receive a second configuration instruction transmitted from the Bluetooth host device (110), and the second control circuit (135) is further arranged to follow the second configuration instruction to operably configure the second member device (130) to operate in the first mode, and follow the second configuration instruction not to deliver the second audio signal to the Bluetooth host device (110) through the second communication circuit (133);

wherein the first control circuit (125) is further arranged to operably generate an event notification when the ambient condition value meets a triggering condition, and to operably transmit the event notification to the Bluetooth host device (110) via the first communication circuit (123); and wherein the second control circuit (135) is further arranged to operably utilize the second communication circuit (133) to receive the event notification to be transmitted from the first member device (120) to the second member device (130) via the Bluetooth host device (110).

7. The Bluetooth device set (102) of claim 6, wherein the second control circuit (135) is further arranged to operably control the second audio processing circuit (137) to convert voice captured by the second voice capturing circuit (174) into the second audio signal after the second communication circuit (133) receives the event notification.

8. The Bluetooth device set (102) of claim 7, wherein the second control circuit (135) is further arranged to operably generate an acknowledgement notification after the second communication circuit (133) receives the event notification, and to operably utilize the second communication circuit (133) to transmit the acknowledgement notification to the Bluetooth host device (110); and wherein the first control circuit (125) is further arranged to operably stop transmitting the first audio signal via the first communication circuit (123) according to the acknowledgement notification after the first communication circuit (123) receives the acknowledgement notification forwarded from the Bluetooth host device (110).

9. The Bluetooth device set (102) of claim 8, wherein the second control circuit (135) is further arranged to operably utilize the second communication circuit (133) to receive a timing sequence information transmitted from the Bluetooth host device (110); and wherein the first control circuit (125) is further arranged to operably stop transmitting the first audio signal via the first communication circuit (123) since a predetermined time slot, wherein the predetermined time slot is determined based on the timing sequence information.

10. The Bluetooth device set (102) of claim 9, wherein the first control circuit (125) is further arranged to operably embed the timing sequence information in the event notification when generating the event notification; and wherein the second control circuit (135) is further arranged to operably utilize the second communication circuit (133) to transmit the second audio signal to the Bluetooth host device (110) over the second isochronous streaming channel (139) since the predetermined time slot.

* * * * *